US012621155B2

(12) United States Patent
Rule et al.

(10) Patent No.:   US 12,621,155 B2
(45) Date of Patent:   *May 5, 2026

(54) SECURE MANAGEMENT OF ACCOUNTS ON DISPLAY DEVICES USING A CONTACTLESS CARD

(71) Applicant: Capital One Services, LLC, McLean, VA (US)

(72) Inventors: Jeffrey Rule, Chevy Chase, MD (US); Kevin Osborn, Newton, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,297

(22) Filed: Dec. 20, 2023

(65) Prior Publication Data

US 2024/0187236 A1     Jun. 6, 2024

Related U.S. Application Data

(63) Continuation of application No. 17/237,717, filed on Apr. 22, 2021, now Pat. No. 11,902,442.

(51) Int. Cl.
*H04L 9/32*          (2006.01)
*G06F 21/35*        (2013.01)

(52) U.S. Cl.
CPC ............ *H04L 9/3213* (2013.01); *G06F 21/35* (2013.01); *H04L 9/3234* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 5,590,038 A | 12/1996 | Pitroda | |
| 5,666,415 A | 9/1997 | Kaufman | |

(Continued)

FOREIGN PATENT DOCUMENTS

| | | | | |
|---|---|---|---|---|
| CN | 101192295 A | 6/2008 | | |
| CN | 105978688 A | * 9/2016 | ........... | H04L 9/0861 |

(Continued)

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

(Continued)

*Primary Examiner* — Michael Pyzocha

(74) *Attorney, Agent, or Firm* — KDW FIRM PLLC

(57)          ABSTRACT

Systems, methods, apparatuses, and computer-readable media for secure management of accounts on display devices using a contactless card. An application executing on a display device may receive a request specifying a service provider. The display device may receive a cryptogram generated a contactless card, and transmit the cryptogram to an authentication server. The authentication server may decrypt the cryptogram and generate a virtual account number associated with the contactless card. The authentication server may transmit the virtual account number to the service provider, which may create an account based at least in part on the virtual account number and the decryption of the cryptogram by the authentication server. The display may receive an authentication token generated by the service provider for the account, and access the account created by (Continued)

the service provider based at least in part on the authentication token.

20 Claims, 20 Drawing Sheets

(56) References Cited

U.S. PATENT DOCUMENTS

| | | | |
|---|---|---|---|
| 6,199,114 B1 | 3/2001 | White | |
| 6,324,271 B1 | 11/2001 | Sawyer | |
| 6,367,011 B1 | 4/2002 | Lee | |
| 6,572,015 B1 | 6/2003 | Norton | |
| 7,252,242 B2 | 8/2007 | Ho | |
| 7,270,276 B2 | 9/2007 | Vayssiere | |
| 7,287,692 B1 | 10/2007 | Patel | |
| 7,374,099 B2 | 5/2008 | de Jong | |
| 7,527,208 B2 | 5/2009 | Hammad | |
| 7,568,631 B2 | 8/2009 | Gibbs | |
| 7,584,153 B2 | 9/2009 | Brown | |
| 7,628,322 B2 | 12/2009 | Holtmanns | |
| 7,793,851 B2 | 9/2010 | Mullen | |
| 7,801,799 B1 | 9/2010 | Brake, Jr. | |
| 7,908,216 B1 | 3/2011 | Davis | |
| 7,922,082 B2 | 4/2011 | Muscato | |
| 8,010,405 B1 | 8/2011 | Bortolin | |
| 8,074,877 B2 | 12/2011 | Mullen | |
| 8,082,450 B2 | 12/2011 | Frey | |
| 8,108,687 B2 | 1/2012 | Ellis | |
| 8,186,602 B2 | 5/2012 | Itay | |
| 8,196,131 B1 * | 6/2012 | von Behren | G06Q 20/02 |
| | | | 705/64 |
| 8,249,654 B1 | 8/2012 | Zhu | |
| 8,276,814 B1 | 10/2012 | Davis | |
| 8,332,272 B2 | 12/2012 | Fisher | |
| 8,346,670 B2 | 1/2013 | Hasson | |
| 8,511,547 B2 | 8/2013 | Rans | |
| 8,519,822 B2 | 8/2013 | Riegebauer | |
| 8,750,514 B2 | 6/2014 | Gallo | |
| 8,870,081 B2 | 10/2014 | Olson | |
| 9,038,893 B2 | 5/2015 | Kirkham | |
| 9,129,199 B2 | 9/2015 | Spodak | |
| 9,183,490 B2 | 11/2015 | Moreton | |
| 9,275,325 B2 | 3/2016 | Newcombe | |
| 9,286,606 B2 | 3/2016 | Diamond | |
| 9,306,753 B1 | 4/2016 | Vandervort | |
| 9,501,776 B2 | 11/2016 | Martin | |
| 9,710,744 B2 | 7/2017 | Wurmfeld | |
| 9,949,065 B1 | 4/2018 | Zarakas | |
| 9,965,632 B2 | 5/2018 | Zarakas | |
| 9,965,911 B2 | 5/2018 | Wishne | |
| 9,977,890 B2 | 5/2018 | Alberti | |
| 9,978,056 B2 | 5/2018 | Seo | |
| 9,978,058 B2 | 5/2018 | Wurmfeld | |
| 9,990,795 B2 | 6/2018 | Wurmfeld | |
| 10,007,873 B2 | 6/2018 | Heo | |
| 10,013,693 B2 | 7/2018 | Wyatt | |
| 10,121,130 B2 | 11/2018 | Pinski | |
| 10,210,505 B2 | 2/2019 | Zarakas | |
| 10,242,368 B1 | 3/2019 | Poole | |
| 10,296,910 B1 | 5/2019 | Templeton | |
| 10,332,102 B2 | 6/2019 | Zarakas | |
| 10,360,557 B2 | 7/2019 | Locke | |
| 10,380,471 B2 | 8/2019 | Locke | |
| 10,387,868 B2 * | 8/2019 | Wentker | H04W 4/80 |
| 10,395,244 B1 | 8/2019 | Mossler | |
| 10,453,054 B2 | 10/2019 | Zarakas | |
| 10,467,622 B1 * | 11/2019 | Rule | G06F 16/9566 |
| 10,474,941 B2 | 11/2019 | Wurmfeld | |
| 10,475,027 B2 | 11/2019 | Guise | |
| 10,482,453 B2 | 11/2019 | Zarakas | |
| 10,482,457 B2 | 11/2019 | Poole | |
| 10,489,774 B2 | 11/2019 | Zarakas | |
| 10,489,781 B1 | 11/2019 | Osborn | |
| 10,510,070 B2 | 12/2019 | Wurmfeld | |
| 10,515,361 B2 | 12/2019 | Zarakas | |
| 10,535,068 B2 | 1/2020 | Locke | |
| 10,546,444 B2 | 1/2020 | Osborn | |
| 10,581,611 B1 | 3/2020 | Osborn | |
| 10,664,830 B1 | 5/2020 | Rule | |
| 10,685,349 B2 | 6/2020 | Brickell | |
| 10,797,882 B2 | 10/2020 | Rule | |
| 10,880,741 B2 | 12/2020 | Zarakas | |
| 10,909,525 B1 * | 2/2021 | Dhodapkar | G06Q 20/3278 |
| 10,970,691 B2 | 4/2021 | Koeppel | |
| 10,984,416 B2 | 4/2021 | Ilincic | |
| 11,037,136 B2 | 6/2021 | Rule | |
| 11,062,098 B1 | 7/2021 | Bergeron | |
| 11,120,453 B2 | 9/2021 | Rule | |
| 11,138,593 B1 | 10/2021 | Ho | |
| 11,138,605 B2 | 10/2021 | Aabye | |
| 11,176,540 B2 | 11/2021 | Gupta | |
| 11,188,908 B2 | 11/2021 | Locke | |
| 11,216,806 B2 | 1/2022 | Mossler | |
| 11,297,958 B2 | 4/2022 | Vukich | |
| 11,334,872 B2 | 5/2022 | Phillips | |
| 11,361,173 B2 | 6/2022 | Edwards | |
| 11,392,933 B2 | 7/2022 | Mossler | |
| 11,392,935 B2 | 7/2022 | Suresh | |
| 11,416,844 B1 | 8/2022 | Osterkamp | |
| 11,423,392 B1 * | 8/2022 | Ho | G06Q 20/409 |
| 11,443,292 B2 | 9/2022 | Sherif | |
| 11,444,770 B2 | 9/2022 | Wieker | |
| 11,461,764 B2 | 10/2022 | Rule | |
| 11,481,764 B2 | 10/2022 | Shakkarwar | |
| 11,521,213 B2 | 12/2022 | Rule | |
| 11,551,200 B1 | 1/2023 | Cook | |
| 11,556,918 B2 | 1/2023 | Mestre | |
| 11,615,395 B2 | 3/2023 | McHugh | |
| 11,777,933 B2 | 10/2023 | Moreton | |
| 11,861,590 B1 * | 1/2024 | Quigley | G06Q 20/352 |
| 11,928,666 B1 * | 3/2024 | Cook | H04L 9/3234 |
| 2003/0220876 A1 | 11/2003 | Burger | |
| 2005/0156026 A1 | 7/2005 | Ghosh | |
| 2005/0228997 A1 | 10/2005 | Bicker | |
| 2005/0269402 A1 | 12/2005 | Spitzer | |
| 2007/0276765 A1 | 11/2007 | Hazel | |
| 2008/0082452 A1 | 4/2008 | Wankmueller | |
| 2008/0099552 A1 | 5/2008 | Grillion | |
| 2009/0143104 A1 | 6/2009 | Loh | |
| 2009/0235339 A1 | 9/2009 | Mennes | |
| 2009/0282264 A1 | 11/2009 | Amiel | |
| 2011/0113245 A1 | 5/2011 | Varadarajan | |
| 2011/0155801 A1 | 6/2011 | Rowberry | |
| 2012/0143703 A1 | 6/2012 | Wall | |
| 2013/0030997 A1 | 1/2013 | Spodak | |
| 2013/0146657 A1 | 6/2013 | Graef | |
| 2013/0211937 A1 | 8/2013 | Elbirt | |
| 2013/0311363 A1 | 11/2013 | Ramaci | |
| 2014/0074637 A1 | 3/2014 | Hammad | |
| 2014/0074655 A1 | 3/2014 | Lim | |
| 2014/0081785 A1 | 3/2014 | Valadas Preto | |
| 2014/0365377 A1 | 12/2014 | Salama | |
| 2015/0032635 A1 | 1/2015 | Guise | |
| 2015/0073983 A1 | 3/2015 | Bartenstein | |
| 2015/0113271 A1 | 4/2015 | Jooste | |
| 2015/0134513 A1 | 5/2015 | Olson | |
| 2015/0199673 A1 | 7/2015 | Savolainen | |
| 2015/0199863 A1 | 7/2015 | Scoggins | |
| 2015/0254637 A1 | 9/2015 | Yang | |
| 2015/0317295 A1 | 11/2015 | Sherry | |
| 2016/0078430 A1 | 3/2016 | Douglas | |
| 2016/0173483 A1 * | 6/2016 | Wong | H04W 12/06 |
| | | | 726/9 |
| 2016/0189143 A1 | 6/2016 | Koeppel | |
| 2016/0253651 A1 | 9/2016 | Park | |
| 2016/0267466 A1 * | 9/2016 | Kumnick | G07F 7/0806 |
| 2016/0277383 A1 | 9/2016 | Guyomarc'h | |
| 2016/0307189 A1 | 10/2016 | Zarakas | |
| 2016/0314472 A1 | 10/2016 | Ashfield | |
| 2016/0321653 A1 | 11/2016 | Jacobs et al. | |
| 2016/0379217 A1 | 12/2016 | Hammad | |
| 2017/0017957 A1 | 1/2017 | Radu | |
| 2017/0039566 A1 | 2/2017 | Schipperheijn | |
| 2017/0068950 A1 | 3/2017 | Kwon | |

(56) References Cited

U.S. PATENT DOCUMENTS

| | | | |
|---|---|---|---|
| 2017/0221047 A1* | 8/2017 | Veerasangappa Kadi ................... G06Q 20/3829 | |
| 2017/0236113 A1* | 8/2017 | Chitalia ................ H04L 9/3213 705/44 | |
| 2017/0330173 A1 | 11/2017 | Woo | |
| 2018/0039987 A1 | 2/2018 | Molino | |
| 2018/0268132 A1 | 9/2018 | Buer | |
| 2018/0300716 A1 | 10/2018 | Carlson | |
| 2019/0172055 A1 | 6/2019 | Hale | |
| 2019/0303945 A1 | 10/2019 | Mitra | |
| 2020/0012798 A1* | 1/2020 | Shankar ................ G06F 21/335 | |
| 2020/0104842 A1* | 4/2020 | Osborn ................... G07F 7/084 | |
| 2020/0104891 A1* | 4/2020 | Rule .................... G06Q 20/352 | |
| 2021/0004806 A1 | 1/2021 | Noe | |
| 2021/0042764 A1* | 2/2021 | Rungta ................. H04L 63/083 | |
| 2021/0167962 A1* | 6/2021 | Wang .................... H04L 9/3213 | |
| 2021/0272098 A1 | 9/2021 | Delsuc | |
| 2021/0304189 A1 | 9/2021 | Gupta | |
| 2021/0357944 A1* | 11/2021 | Rule .................... G06F 16/955 | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335406 A1* | 10/2022 | Xu ...................... G06Q 20/3223 | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0046119 A1* | 2/2023 | Wang .................... G06Q 20/02 | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0267449 A1* | 8/2023 | Cook ...................... H04B 5/72 705/35 | |
| 2023/0354020 A1 | 11/2023 | Rule | |
| 2023/0359839 A1 | 11/2023 | Lovgren | |

FOREIGN PATENT DOCUMENTS

| | | |
|---|---|---|
| GB | 2516861 A | 2/2015 |
| GB | 2551907 A | 1/2018 |
| JP | 2019067168 A | 4/2019 |
| JP | 2019096090 A | 6/2019 |
| KR | 20150140132 A | 12/2015 |
| WO | 9910824 A1 | 3/1999 |
| WO | 0049586 A1 | 8/2000 |
| WO | 2013155562 A1 | 10/2013 |
| WO | 2015183818 A1 | 12/2015 |
| WO | 2017047855 A1 | 3/2017 |
| WO | 2019022585 A1 | 1/2019 |
| WO | 2021015969 A1 | 1/2021 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

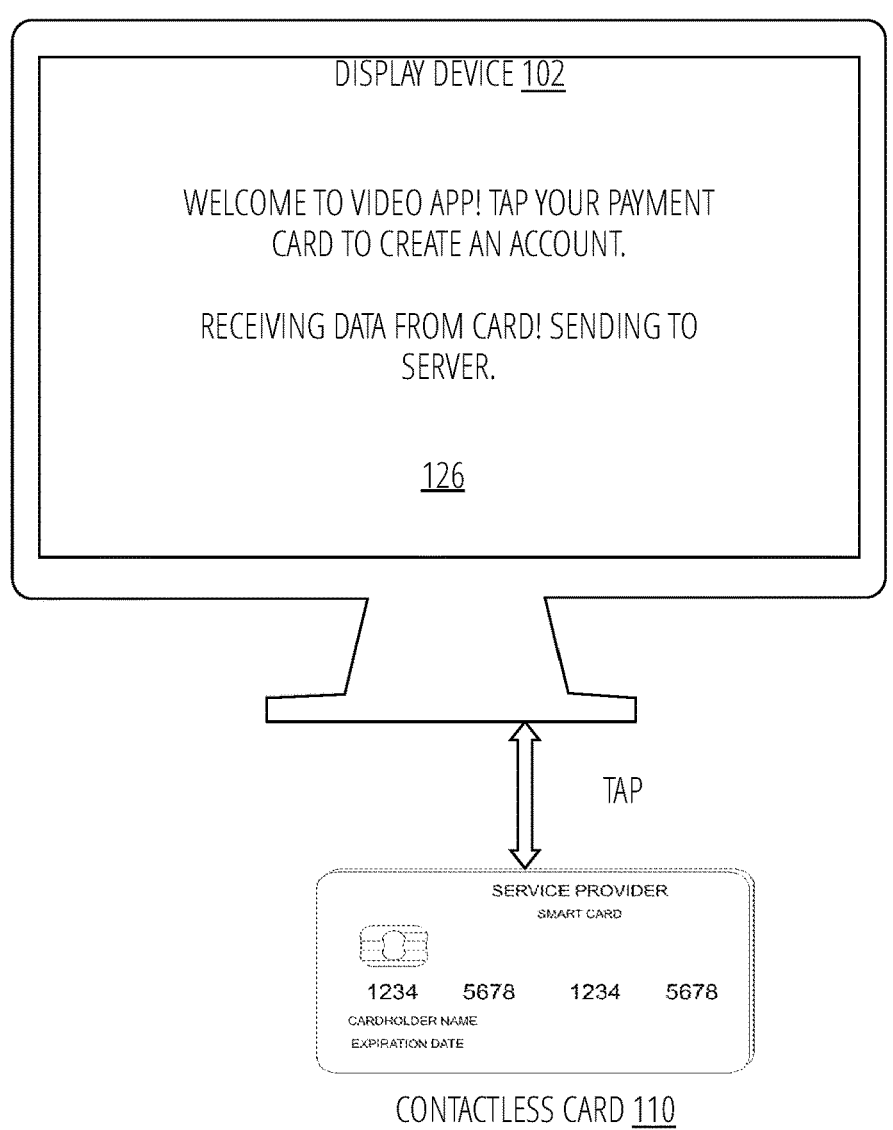
FIG. 3A

300b

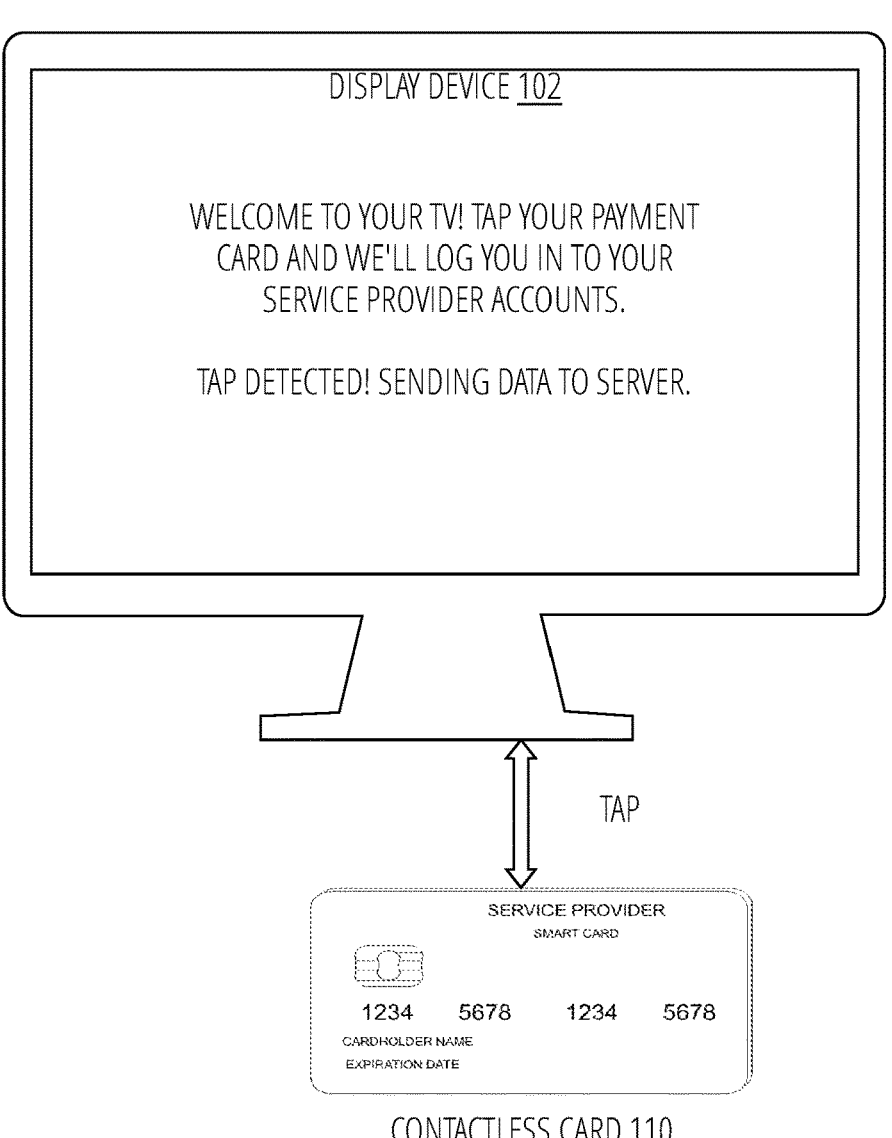
FIG. 4A

400b

DISPLAY DEVICE 102

SUCCESS! YOU HAVE BEEN LOGGED INTO THE
FOLLOWING SERVICE PROVIDERS. CLICK ANY
TO ACCESS YOUR ACCOUNT:

SERVICE PROVIDER A
SERVICE PROVIDER B
SERVICE PROVIDER C

Figure 5:
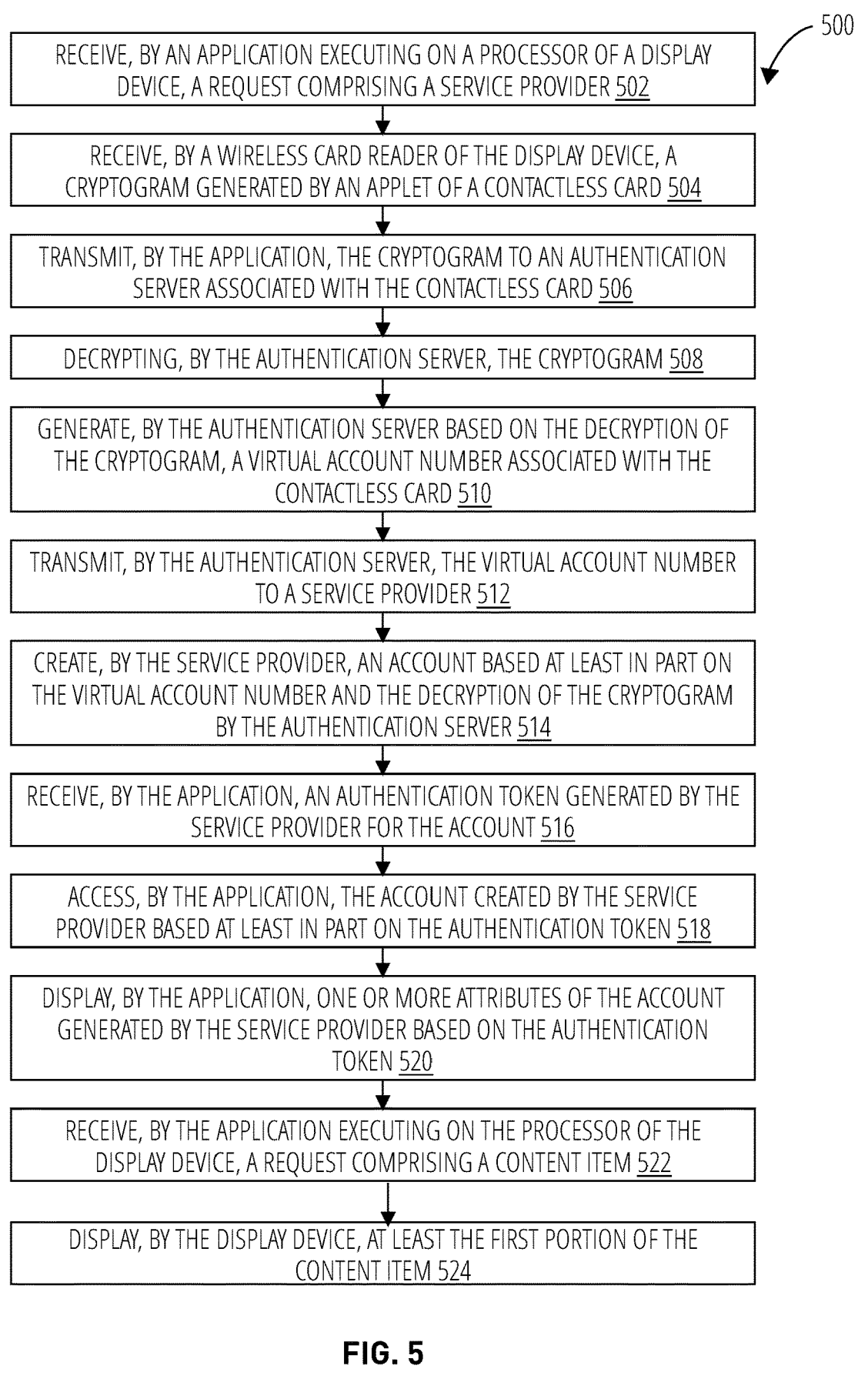

500

RECEIVE, BY AN APPLICATION EXECUTING ON A PROCESSOR OF A DISPLAY DEVICE, A REQUEST COMPRISING A SERVICE PROVIDER 502

RECEIVE, BY A WIRELESS CARD READER OF THE DISPLAY DEVICE, A CRYPTOGRAM GENERATED BY AN APPLET OF A CONTACTLESS CARD 504

TRANSMIT, BY THE APPLICATION, THE CRYPTOGRAM TO AN AUTHENTICATION SERVER ASSOCIATED WITH THE CONTACTLESS CARD 506

DECRYPTING, BY THE AUTHENTICATION SERVER, THE CRYPTOGRAM 508

GENERATE, BY THE AUTHENTICATION SERVER BASED ON THE DECRYPTION OF THE CRYPTOGRAM, A VIRTUAL ACCOUNT NUMBER ASSOCIATED WITH THE CONTACTLESS CARD 510

TRANSMIT, BY THE AUTHENTICATION SERVER, THE VIRTUAL ACCOUNT NUMBER TO A SERVICE PROVIDER 512

CREATE, BY THE SERVICE PROVIDER, AN ACCOUNT BASED AT LEAST IN PART ON THE VIRTUAL ACCOUNT NUMBER AND THE DECRYPTION OF THE CRYPTOGRAM BY THE AUTHENTICATION SERVER 514

RECEIVE, BY THE APPLICATION, AN AUTHENTICATION TOKEN GENERATED BY THE SERVICE PROVIDER FOR THE ACCOUNT 516

ACCESS, BY THE APPLICATION, THE ACCOUNT CREATED BY THE SERVICE PROVIDER BASED AT LEAST IN PART ON THE AUTHENTICATION TOKEN 518

DISPLAY, BY THE APPLICATION, ONE OR MORE ATTRIBUTES OF THE ACCOUNT GENERATED BY THE SERVICE PROVIDER BASED ON THE AUTHENTICATION TOKEN 520

RECEIVE, BY THE APPLICATION EXECUTING ON THE PROCESSOR OF THE DISPLAY DEVICE, A REQUEST COMPRISING A CONTENT ITEM 522

DISPLAY, BY THE DISPLAY DEVICE, AT LEAST THE FIRST PORTION OF THE CONTENT ITEM 524

Figure 6:
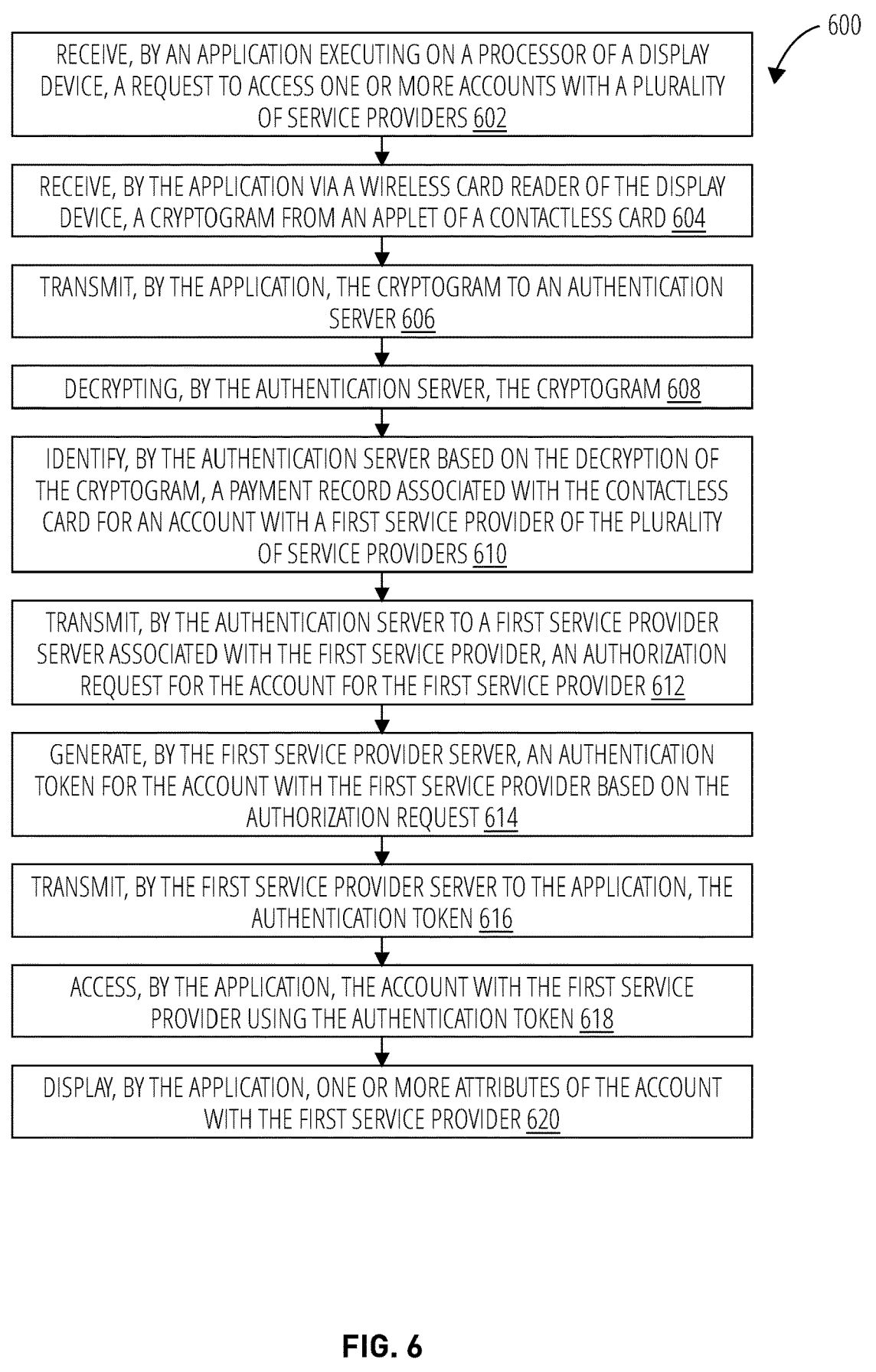

RECEIVE, BY AN APPLICATION EXECUTING ON A PROCESSOR OF A DISPLAY DEVICE, A REQUEST TO ACCESS ONE OR MORE ACCOUNTS WITH A PLURALITY OF SERVICE PROVIDERS 602

↓

RECEIVE, BY THE APPLICATION VIA A WIRELESS CARD READER OF THE DISPLAY DEVICE, A CRYPTOGRAM FROM AN APPLET OF A CONTACTLESS CARD 604

↓

TRANSMIT, BY THE APPLICATION, THE CRYPTOGRAM TO AN AUTHENTICATION SERVER 606

↓

DECRYPTING, BY THE AUTHENTICATION SERVER, THE CRYPTOGRAM 608

↓

IDENTIFY, BY THE AUTHENTICATION SERVER BASED ON THE DECRYPTION OF THE CRYPTOGRAM, A PAYMENT RECORD ASSOCIATED WITH THE CONTACTLESS CARD FOR AN ACCOUNT WITH A FIRST SERVICE PROVIDER OF THE PLURALITY OF SERVICE PROVIDERS 610

↓

TRANSMIT, BY THE AUTHENTICATION SERVER TO A FIRST SERVICE PROVIDER SERVER ASSOCIATED WITH THE FIRST SERVICE PROVIDER, AN AUTHORIZATION REQUEST FOR THE ACCOUNT FOR THE FIRST SERVICE PROVIDER 612

↓

GENERATE, BY THE FIRST SERVICE PROVIDER SERVER, AN AUTHENTICATION TOKEN FOR THE ACCOUNT WITH THE FIRST SERVICE PROVIDER BASED ON THE AUTHORIZATION REQUEST 614

↓

TRANSMIT, BY THE FIRST SERVICE PROVIDER SERVER TO THE APPLICATION, THE AUTHENTICATION TOKEN 616

↓

ACCESS, BY THE APPLICATION, THE ACCOUNT WITH THE FIRST SERVICE PROVIDER USING THE AUTHENTICATION TOKEN 618

↓

DISPLAY, BY THE APPLICATION, ONE OR MORE ATTRIBUTES OF THE ACCOUNT WITH THE FIRST SERVICE PROVIDER 620

MEMORY 712

PROCESSOR 710

APPLET 114

COUNTER 116

MASTER KEY 118

CUSTOMER ID 122

DIVERSIFIED KEY 120

COMMUNICATIONS INTERFACE 128

ACCOUNT NUMBER(S) 714

SECURE MANAGEMENT OF ACCOUNTS ON DISPLAY DEVICES USING A CONTACTLESS CARD

CROSS-REFERENCE TO RELATED APPLICATIONS

This application is a continuation of U.S. patent application Ser. No. 17/237,717, filed on Apr. 22, 2021, the disclosure of which is incorporated herein by reference in its entirety.

BACKGROUND

Display devices, such as televisions, may provide different applications that allow users to access content hosted by service providers. Often, a user is required to pay for such services. However, most televisions do not have input interfaces that allow a user to easily enter their personal information. Furthermore, users of these input interfaces often make errors, requiring multiple attempts to enter correct information. These input interfaces may also pose security risks, as personal information may be visible on the display when entered by the user. Similarly, malicious users may be able to copy the input as the user enters the information via the input interfaces, thereby posing security risks.

SUMMARY

In one aspect, a method, includes receiving, by an application executing on a processor of a display device, a request includes a service provider, receiving, by a wireless card reader of the display device, a cryptogram generated by an applet of a contactless card, transmitting, by the application, the cryptogram to an authentication server associated with the contactless card, decrypting, by the authentication server, the cryptogram, generating, by the authentication server based on the decryption of the cryptogram, a virtual account number associated with the contactless card, transmitting, by the authentication server, the virtual account number to the service provider, creating, by the service provider, an account based at least in part on the virtual account number and the decryption of the cryptogram by the authentication server, receiving, by the application, an authentication token generated by the service provider for the account, accessing, by the application, the account created by the service provider based at least in part on the authentication token, and displaying, by the application, one or more attributes of the account generated by the service provider based on the authentication token. Other embodiments are described and claimed.

BRIEF DESCRIPTION OF THE SEVERAL VIEWS OF THE DRAWINGS

FIG. 3A illustrates an aspect of the subject matter in accordance with one embodiment.

FIG. 4A illustrates an aspect of the subject matter in accordance with one embodiment.

FIG. 5 illustrates a logic flow in accordance with one embodiment.

FIG. 6 illustrates a logic flow in accordance with one embodiment.

DETAILED DESCRIPTION

Figure 1A:
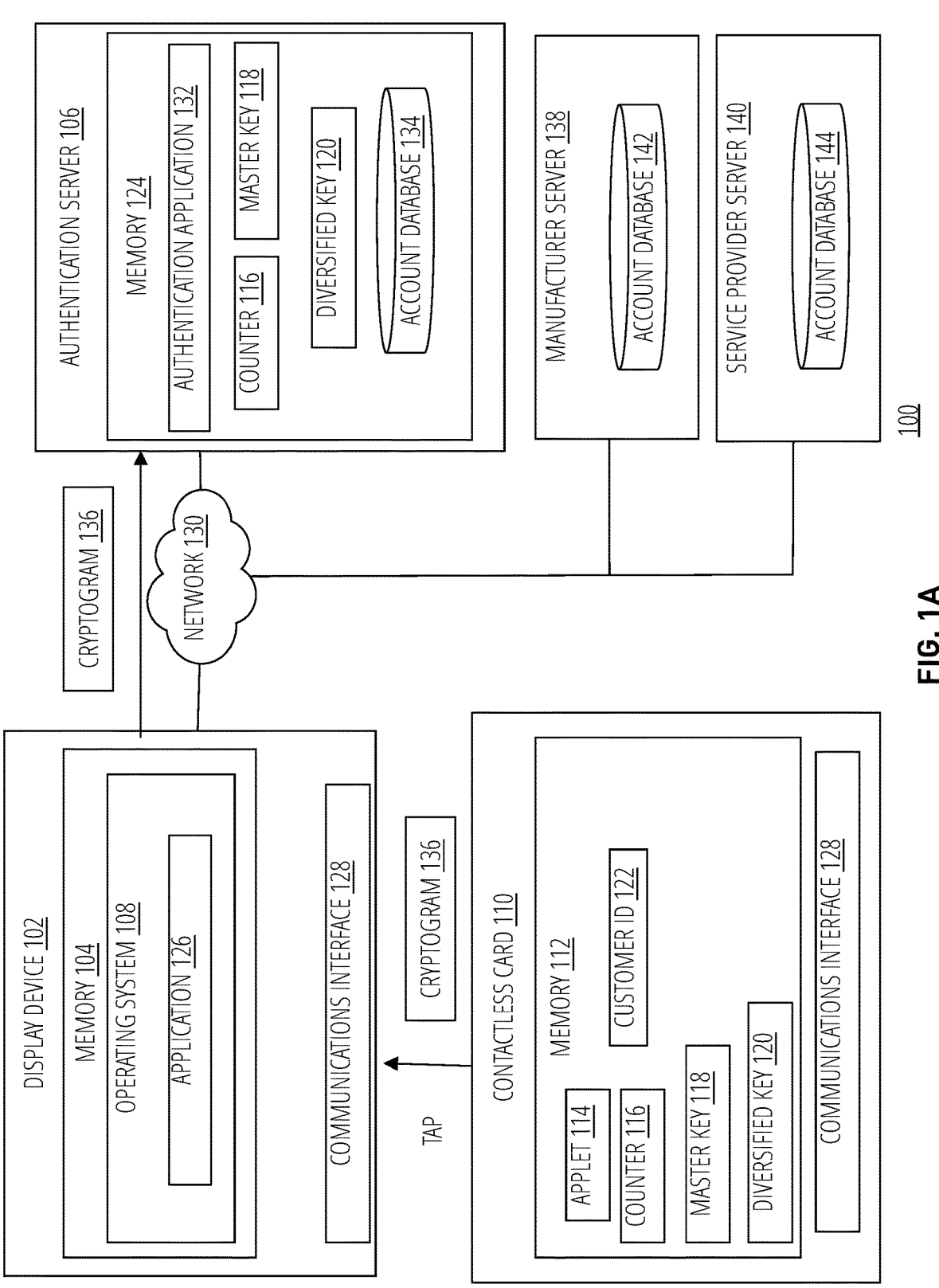
FIG. 1A illustrates an aspect of the subject matter in accordance with one embodiment.

Embodiments disclosed herein provide techniques to securely manage service provider accounts on a display device, such as a television, using a contactless card. Generally, the display device may have a wireless card reader, such as a near-field communications (NFC) reader, that allows the display device to wirelessly communicate with a contactless card. To create a new account for a first service provider (or extend an existing account), such as a video-on-demand (VOD) service provider, a user may tap their contactless card to the display device. In response, the display device may instruct an applet executing on the contactless card to generate a cryptogram. The wireless card reader of the display may read the cryptogram and transmit the cryptogram to an authentication server for processing. If the authentication server is able to decrypt the cryptogram, the authentication server may generate a virtual account number for the contactless card. In some embodiments, the virtual account number is restricted to use with the first service provider (e.g., the virtual account number may only be used for payments with the first service provider). The authentication server may then transmit the virtual account number (and other data) as part of a request to generate an account to the first service provider. The first service provider may then generate an account for the user using the virtual account number (and other data) specified in the request. The first service provider may then generate an account authentication token for the account (or identify an existing token for the account) and transmit the token to the display device. In some embodiments, the first service provider may transmit the account token to other devices, such as to a manufacturer server associated with a manufacturer of the display device. Once received, an application executing on the display device may use the account token to access the account with the first service provider. For example, the user may view content hosted by the first service provider, view account details of the account created by the first service provider, and the like.

Furthermore, in some embodiments, the contactless card may be used to improve the login process for a plurality of service provider accounts. For example, a user may purchase a new display device and/or reset the software on a display device. The user may tap the contactless card to the display device, which causes the contactless card to generate a cryptogram and transmit the cryptogram to the display device. The display device may then transmit the cryptogram to the authentication server, which may decrypt the cryptogram. The authentication server may then identify, in payment records associated with the contactless card, one or more payment records for one or more service providers. For example, the authentication server may determine, based on the payment records, that the contactless card was used to pay for a subscription to service provider A. Based on the decryption of the cryptogram and the payment records, the authentication server may generate an authentication request for service provider A. The request may include a token generated by the authentication server. The authentication server may transmit the request to service provider A. Service provider A may then generate an account token for the account (or identify an existing account token for the account) and transmit the account token to the display device. An application associated with service provider A on the display device may use the token to log in to the account with service provider A. The new display device may automatically log in to the account with service provider A. Using this technique, the new display device may automatically log into any other accounts with service providers the contactless card has been used to provide payment data.

Advantageously, embodiments disclosed herein provide secure techniques creating and managing accounts on a display device using a contactless card. By leveraging cryptograms generated by contactless cards, embodiments of the disclosure may securely verify the identity of the user requesting to perform an operation with minimal risk of fraudulent activity. Furthermore, new accounts can be securely generated using payment information (e.g., a virtual account number) that is not compromised by a user entering the payment information on the display device. Doing so improves the security of the contactless card and the associated account. Further still, by providing an automated login process, embodiments disclosed herein may allow the display device to securely access all service provider accounts of the user with a single tap of the contactless card.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts an exemplary computing architecture 100, also referred to as a system, consistent with disclosed embodiments. Although the computing architecture 100 shown in FIGS. 1A-1E has a limited number of elements in a certain topology, it may be appreciated that the computing architecture 100 may include more or less elements in alternate topologies as desired for a given implementation. The system 100 comprises a display device 102, a contactless card 110, an authentication server 106, one or more manufacturer servers 138, one or more service provider servers 140, a memory 112, an applet 114, a counter 116, a master key 118, a diversified key 120, a customer ID 122, an application 126, a communications interface 128, a network 130, an authentication application 132, a memory 124, an account database 134, a cryptogram 136, an operating system 108, a memory 104, an account database 142, and an account database 144.

The contactless card 110 is representative of any type of card, such as a credit card, debit card, ATM card, gift card, smart card, and the like. The contactless card 110 may comprise one or more communications interfaces 128, such as a radio frequency identification (RFID) chip, configured to communicate with a communications interface 128 (also referred to herein as a "card reader", a "wireless card reader", and/or a "wireless communications interface") of the display device 102 via NFC, the EMV standard, or other short-range protocols in wireless communication. Although NFC is used as an example communications protocol herein, the disclosure is equally applicable to other types of wireless communications, such as the EMV standard, Bluetooth, and/or Wi-Fi.

The display device 102 is representative of any number and type of display device, such as a television, monitor, projector, and the like. The authentication server 106, service provider server 140, and manufacturer server 138 are representative of any type of computing device, such as a server, workstation, compute cluster, cloud computing platform, virtualized computing system, and the like. Although not depicted for the sake of clarity, the display device 102, contactless card 110, and authentication server 106, service provider server 140, and manufacturer server 138 each include one or more processor circuits to execute programs, code, and/or instructions.

As shown, a memory 104 of the contactless card 110 includes an applet 114, a counter 116, a master key 118, a diversified key 120, and a unique customer ID 122. The applet 114 is executable code configured to perform the operations described herein. The counter 116, master key 118, diversified key 120, and customer ID 122 are used to provide security in the system 100 as described in greater detail below.

As shown, a memory 104 of the display device 102 includes an instance of an operating system (OS) 108, which may include an embedded operating system. Example operating systems 108 include webOS, Android® OS, iOS®, macOS®, Linux®, Tizen®, and Windows® operating systems. As shown, the operating system 108 includes one or more applications 126. The applications 126 are representative of any type of application, such as an application 126 provided by a service provider, a web browser, and the like. For example, a given application 126 may be associated with a service provider server 140. For example, an application 126-1 may be associated with a service provider server 140-1, and so on. Generally, a given application 126 allows users to access content items or other subscription-based services. For example, the applications 126 may be used to stream videos, audio, images, and any other type of content hosted by the service provider servers 140. However, because the service provider may require payment to access the associated services, the applications 126 may be used to view account details, register for services, make payments, update payment information, etc. The service providers may generally be any type of online service provider, such as video service providers, audio service providers, and the like.

As shown, a memory 124 of the authentication server 106 includes an authentication application 123. In some embodiments, to secure the contactless card 110, the application 126, and/or associated data, e.g., details of the user's account in the account database 134, account database 144, and/or account database 142, the system 100 may provide for secure account management using the contactless card 110. For example, a user may wish to open a new account with a service provider associated with service provider server 140, extend services for an existing account with the service provider, and the like. In some embodiments, the user may execute an application 126 associated with the service provider server 140, and may instruct the user to tap the contactless card 110 to the display device 102.

In the embodiment depicted in FIG. 1A, the user may tap the contactless card 110 to the display device 102 (or otherwise bring the contactless card 110 within communications range of the communications interface 128 of the display device 102). The applet 114 of the contactless card 110 may then generate a cryptogram 136. The cryptogram 136 may be based on the customer ID 122 of the contactless card 110. More generally, the cryptogram 136 may be generated based on any suitable cryptographic technique. In some embodiments, the applet 114 may include the cryptogram 136 and an unencrypted identifier (e.g., the customer ID 122, an identifier of the contactless card 110, an identifier of the application 126, and/or any other unique identifier) as part of a data package. In at least one embodiment, the data package is an NDEF file. In some embodiments, the application 126 transmits an application identifier to the applet 114, which may include the application identifier in the cryptogram 136 and/or unencrypted in the data package. The application identifier may uniquely identify a given application 126.

As stated, the computing architecture 100 is configured to implement key diversification to secure data, which may be referred to as a key diversification technique herein. Generally, the authentication server 106 (or another computing device) and the contactless card 110 may be provisioned with the same master key 118 (also referred to as a master symmetric key). More specifically, each contactless card 110 is programmed with a distinct master key 118 that has a corresponding pair in the authentication server 106. For example, when a contactless card 110 is manufactured, a unique master key 118 may be programmed into the memory 112 of the contactless card 110. Similarly, the unique master key 118 may be stored in a record of a customer associated with the contactless card 110 in the account database 134 of the authentication server 106 (and/or stored in a different secure location, such as hardware security module (HSM), not pictured). The master key 118 may be kept secret from all parties other than the contactless card 110 and authentication server 106, thereby enhancing security of the system 100. In some embodiments, the applet 114 of the contactless card 110 may encrypt and/or decrypt data (e.g., the customer ID 122) using the master key 118 and the data as input a cryptographic algorithm. For example, encrypting the customer ID 122 with the master key 118 may result in the cryptogram 136. Similarly, the authentication server 106 may encrypt and/or decrypt data associated with the contactless card 110 using the corresponding master key 118.

In other embodiments, the master keys 118 of the contactless card 110 and authentication server 106 may be used in conjunction with the counters 116 to enhance security using key diversification. The counters 116 comprise values that are synchronized between the contactless card 110 and authentication server 106. The counter 116 may comprise a number that changes each time data is exchanged between the contactless card 110 and the authentication server 106 (and/or the contactless card 110 and the display device 102). When preparing to send data (e.g., to the authentication server 106 and/or the display device 102), the applet 114 of the contactless card 110 may increment the counter 116. The applet 114 of the contactless card 110 may then provide the master key 118 and counter 116 as input to a cryptographic algorithm, which produces a diversified key 120 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the applet 114 may then encrypt the data (e.g., the customer ID 122 and/or any other data) using the diversified key 120 and the data as input to the cryptographic algorithm. For example, encrypting the customer ID 122 with the diversified key 120 may result in an encrypted customer ID (e.g., a cryptogram 136). The operating system 108 and/or the application 126 may then read the data package including the cryptogram 136 via the communications interface 128 of the display device 102.

The application 126 may then transmit the cryptogram 136 to the authentication server 106 with a request to generate an account with the service provider server 140. The request may be a generic request for any service offered by the service provider and/or a specific request for a specific service offered by the service provider. For example, the application 126 may allow the user to select one or more different service plans available with the service provider. The user may select one or more of the plans, and the application 126 may include an indication of the selected plan with the request. Further still, the application 126 may include another identifier, such as the unencrypted customer ID 122 provided by the applet 114 in the data package for the cryptogram 136. In some embodiments, the another identifier may be an identifier of the contactless card 110, an account identifier, an identifier of the application 126, and the like. Doing so may allow the authentication server 106 to identify the corresponding service provider server 140 when processing the request. Furthermore, in some embodiments, the application 126 may transmit additional data to the authentication server 106, such as location data for the display device 102. The location information may include global positioning system (GPS) coordinates, an IP address of the display device 102, and the like. Additionally and/or alternatively, the application 126 may include a unique identifier of the display device 102, such as a media access control (MAC) address of the display device 102 and/or another unique identifier.

Figure 1B:
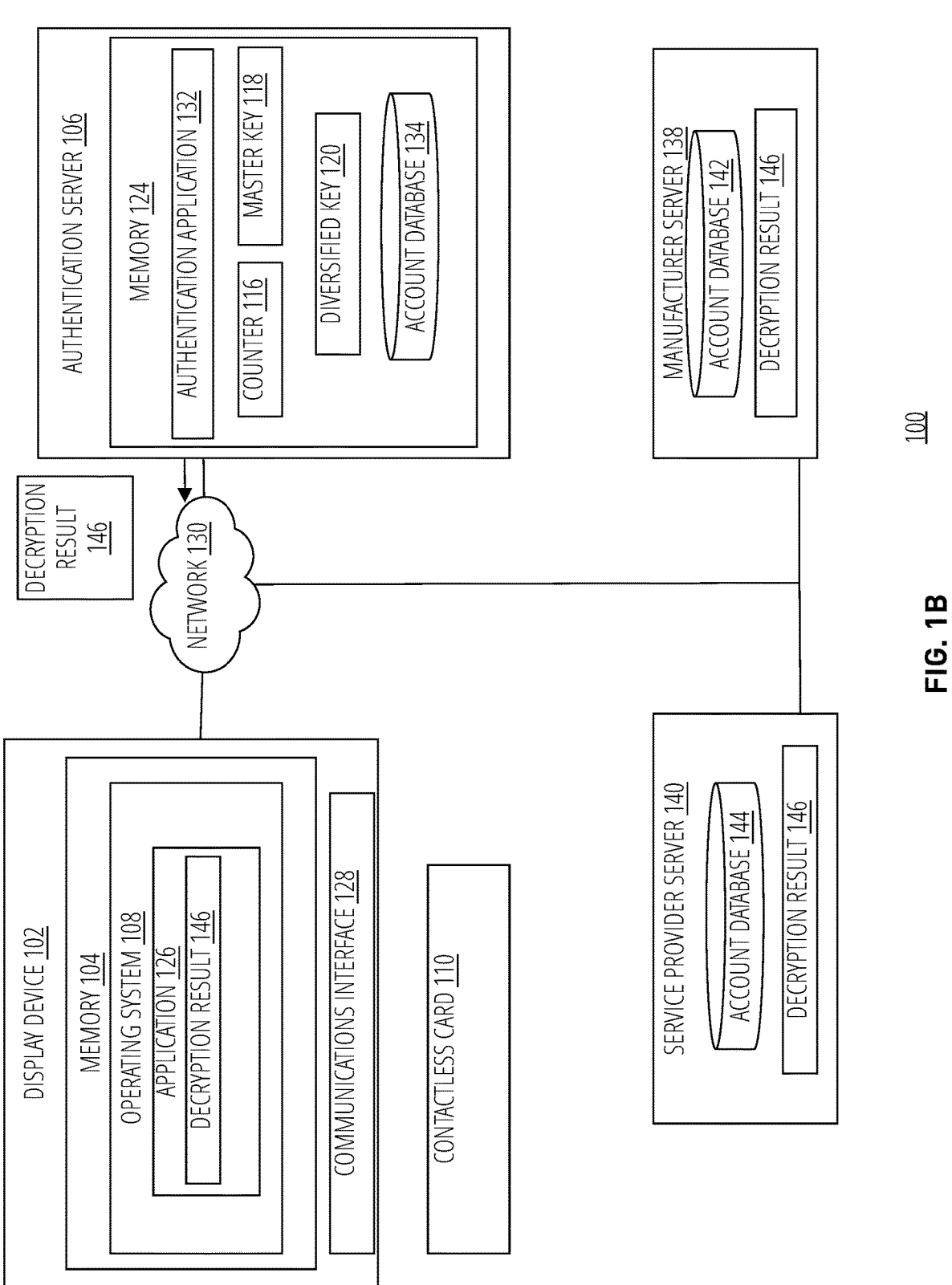
FIG. 1B illustrates an aspect of the subject matter in accordance with one embodiment.

FIG. 1B depicts an embodiment where the authentication server 106 attempts to decrypt the cryptogram 136. For example, the authentication application 132 may attempt to decrypt the cryptogram 136 using a copy of the master key 118 stored by the authentication server 106. In some embodiments, the authentication application 132 may identify the master key 118 and counter 116 using the unencrypted customer ID 122 (or other identifier) provided by the application 126 in the request. In some examples, the authentication application 132 may provide the master key 118 and counter 116 as input to the cryptographic algorithm, which produces a diversified key 120 as output. The resulting diversified key 120 may correspond to the diversified key 120 generated by the contactless card 110, which may be used to decrypt the cryptogram 136.

Regardless of the decryption technique used, the authentication application 132 may successfully decrypt the cryptogram 136, thereby verifying or authenticating the cryptogram 136 in the request (e.g., by comparing the customer ID 122 that is produced by decrypting the cryptogram 136 to a known customer ID stored in the account databases 134, and/or based on an indication that the decryption using the master key 118 and/or diversified key 120 was successful). The authentication application 132 may then transmit a decryption result 146 (also referred to as a "verification result" and/or an "authentication result") to the display device 102. In some embodiments, the authentication application 132 may also transmit the decryption result 146 to the manufacturer server 138 and/or the service provider server 140. The decryption result 146 generally indicates whether the cryptogram 136 was decrypted and/or was not decrypted.

If the decryption is successful, the authentication application 132 may generate payment information comprising a virtual account number (VAN), expiration date of the VAN, and a card verification value (CVV) of the VAN. Furthermore, the authentication application 132 may identify metadata such as contact information for the user, e.g., an email address, phone number, etc., stored in the account database 134. The authentication application 126 may identify the metadata based on the unencrypted identifier included in the cryptogram 136. If the decryption is not successful, the authentication application 132 does not generate the payment information to preserve the security of the contactless card 110 and/or the associated account.

Figure 1C:
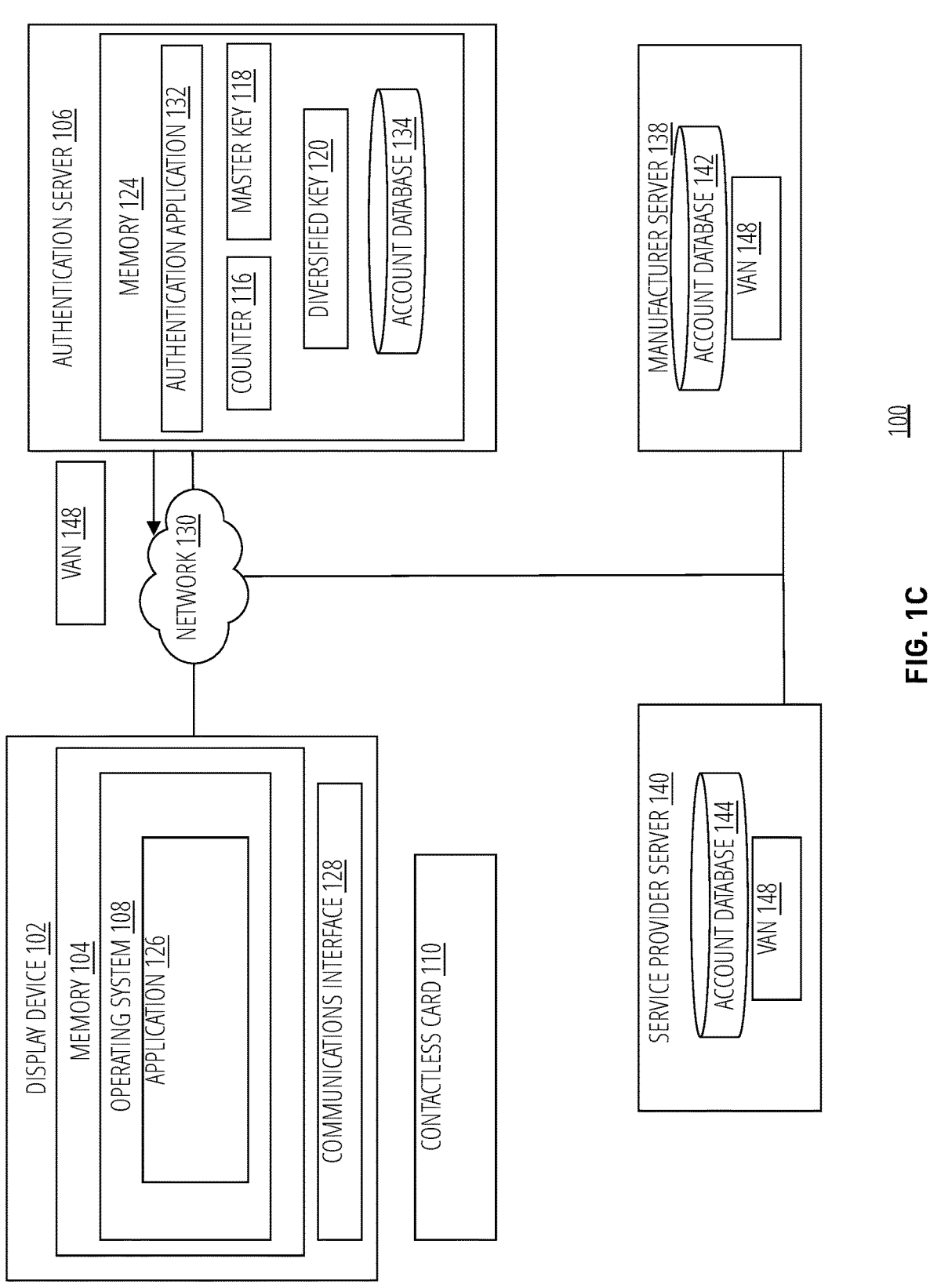
FIG. 1C illustrates an aspect of the subject matter in accordance with one embodiment.

FIG. 1C depicts an embodiment where the decryption result 146 indicates the authentication application 132 successfully decrypted the cryptogram 136. Based on the successful decryption of the cryptogram 136, the authentication application 132 may generate payment information 148 comprising a virtual account number (VAN), expiration date of the VAN, and a card verification value (CVV) of the VAN. Furthermore, the authentication application 132 may identify contact information for the user, e.g., first name, last name, an email address, billing address, phone number, etc., stored in the account database 134. The authentication application 132 may identify the contact information based on the unencrypted identifier included in the cryptogram 136. The authentication application 132 may further include the contact information with the payment information 148. Further still, the authentication application 132 may include an identifier of the display device 102 and/or a service plan selected by the user with the payment information 148. More generally, the payment information payment information 148 may generally be included as part of a request to create an account (and/or extend services for an existing account) with the service provider server 140.

As shown, the authentication application 132 may transmit the payment information 148 (with expiration date, CVV, contact information, and identifier of the display device 102) to the manufacturer server 138 and/or the service provider server 140. In some embodiments, the payment information 148 is transmitted to the manufacturer server 138, which in turn transmits the payment information 148 to the service provider server 140. In some embodiments, the manufacturer server 138 and/or service provider server 140 may transmit a signal to the display device 102 to enable services with the service provider responsive to receiving the payment information 148.

In some embodiments, the authentication application 132 may leverage additional security measures before generating the payment information 148. For example, the authentication application 132 may generate a one-time passcode (OTP) and transmit the OTP to the identified contact information (e.g., to an email address, phone number, etc.). The user may then provide the OTP (e.g., alphanumeric characters) as input in an interface provided the authentication application 132, e.g., via a web browser and/or one of the applications 126. The authentication application 132 may compare the OTP received from the user to the generated OTP. If the comparison results in a match, the authentication application 132 may generate the payment information 148. If the comparison does not result in a match, the authentication application 132 may refrain from generating the payment information 148.

Additionally and/or alternatively, the authentication application 132 may analyze the location information (e.g., GPS coordinates, IP address) of the display device 102 as a security measure. For example, the authentication application 132 may determine a location of the display device 102 based on the GPS coordinates and/or the IP address of the display device 102. The authentication application 132 may then determine whether the determined location is within a predefined distance (e.g., 1 mile, 10 miles, etc.) of an address (e.g., mailing address, billing address) associated with the contactless card 110 in the account database 134. If the determined location of the display device 102 is within the predefined distance of the address associated with the contactless card 110, the authentication application 132 may generate the VAN. If the determined location of the display device 102 is not within the predefined distance of the address associated with the contactless card 110, the authentication application 132 may refrain from generating the payment information 148.

In some embodiments, the payment information 148, including the VAN, expiration date, and CVV, may be restricted to a merchant, e.g., the service provider corresponding to the service provider server 140. In such embodiments, the payment information 148 can only be used to process a payment with the merchant. If the payment information 148 is used as payment for a transaction with a different merchant (e.g., a different service provider, etc.), the authentication server 106 may reject the attempted transaction. For example, if the payment information 148 is restricted to service provider A, and the customer attempts to use the payment information 148 to pay for services with service provider B, the authentication server 106 may reject the attempted payment for service provider B.

Figure 1D:
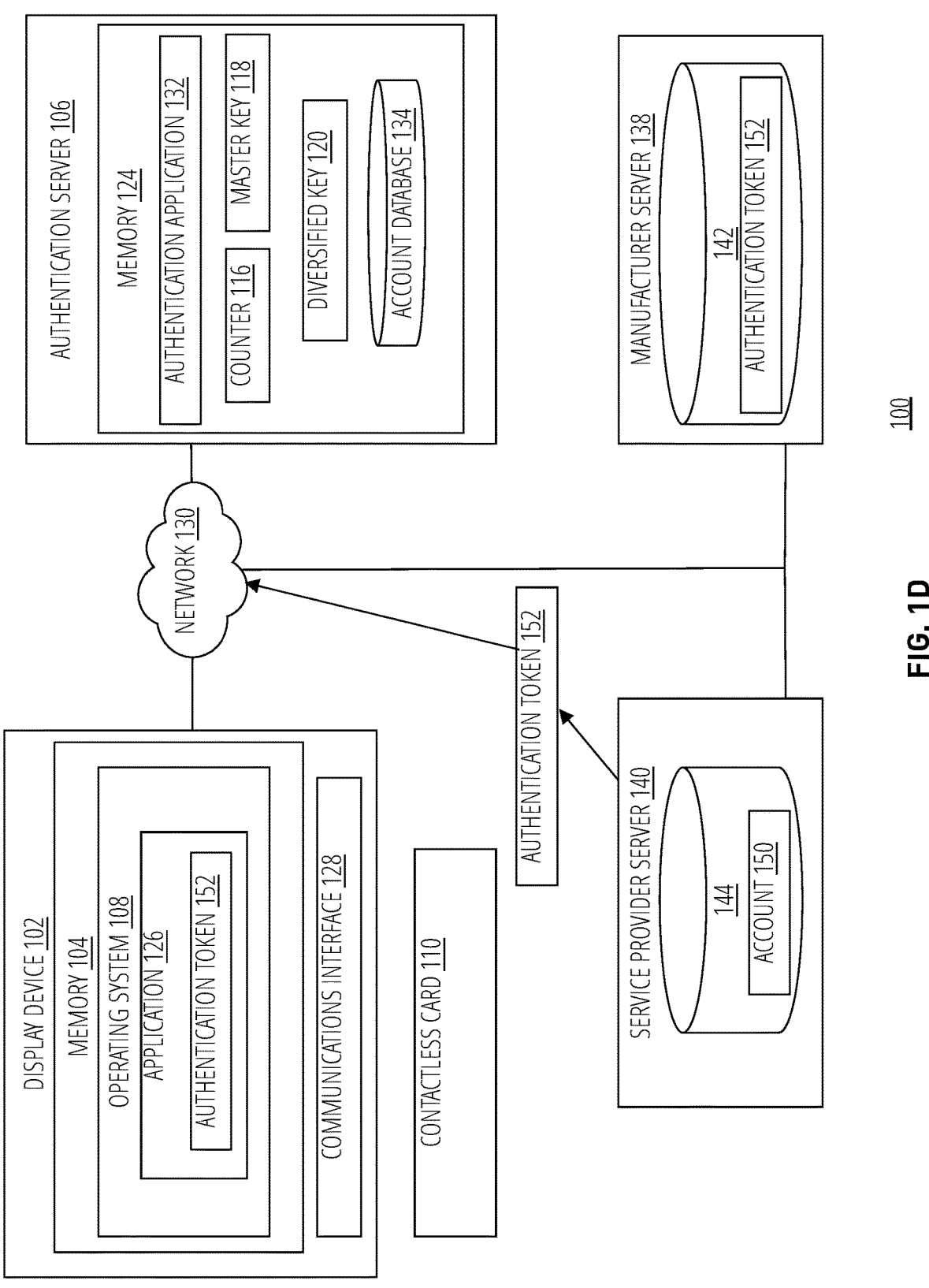
FIG. 1D illustrates an aspect of the subject matter in accordance with one embodiment.

FIG. 1D illustrates an embodiment where the service provider server 140 generates an account 150 in the account database 144 for the user based on the payment information 148 and any other information provided by the authentication server 106. For example, as stated, the authentication server 106 may include the user's email address, name, phone number, selected plan, etc. Similarly, the authentication server 106 may include an identifier of the display device 102, such as a device identifier, IP address, etc. The account record 150 may generally include this and any other information for the account 150. In some embodiments, the service provider server 140 may transmit a signal to the display device 102 to enable services with the service provider 140. In some embodiments, the signal is transmitted by the service provider server 140 to the manufacturer server 138, which then transmits the signal to the display device 102 to enable services with the service provider 140.

Furthermore, the service provider server 140 may generate an authentication token 152 for the account 150. The authentication token 152 may include any type of information, such as a hash value, to uniquely identify the authentication token 152. The authentication token 152 may further include additional attributes of the account 150, such as account numbers, preferences, login/password, etc. The service provider server 140 may transmit the authentication token 152 to the display device 102 and/or the manufacturer server 138. In some embodiments, the service provider server 140 transmits the authentication token 152 to the manufacturer server 138, which transmits the authentication token 152 to the display device 102. In some embodiments, the authentication token 152 is configured to enable access to services provided by the service provider server 140.

As shown, the application 126 of the display device 102 may receive the authentication token 152. In some embodiments, the application 126 may provide the authentication token 152 to the service provider server 140, which may authenticate the application 126 using the authentication token 152, e.g., based on comparing the authentication token 152 received from the display device 102 to the authentication token 152 stored in the account 150. If the comparison results in a match, the application 126 may be authenticated and the account 150 may be accessed, e.g., based on data/commands sent by the service provider server 140. Doing so may allow the user to view details of the account 150 on the display device 102 via the application 126, view content via the application 126, make purchases via the application 126, and the like. In some embodiments, the application 126 authenticates the authentication token 152 locally and accesses the account 150 based on locally stored data and/or data received from the service provider server 140.

Figure 1E:
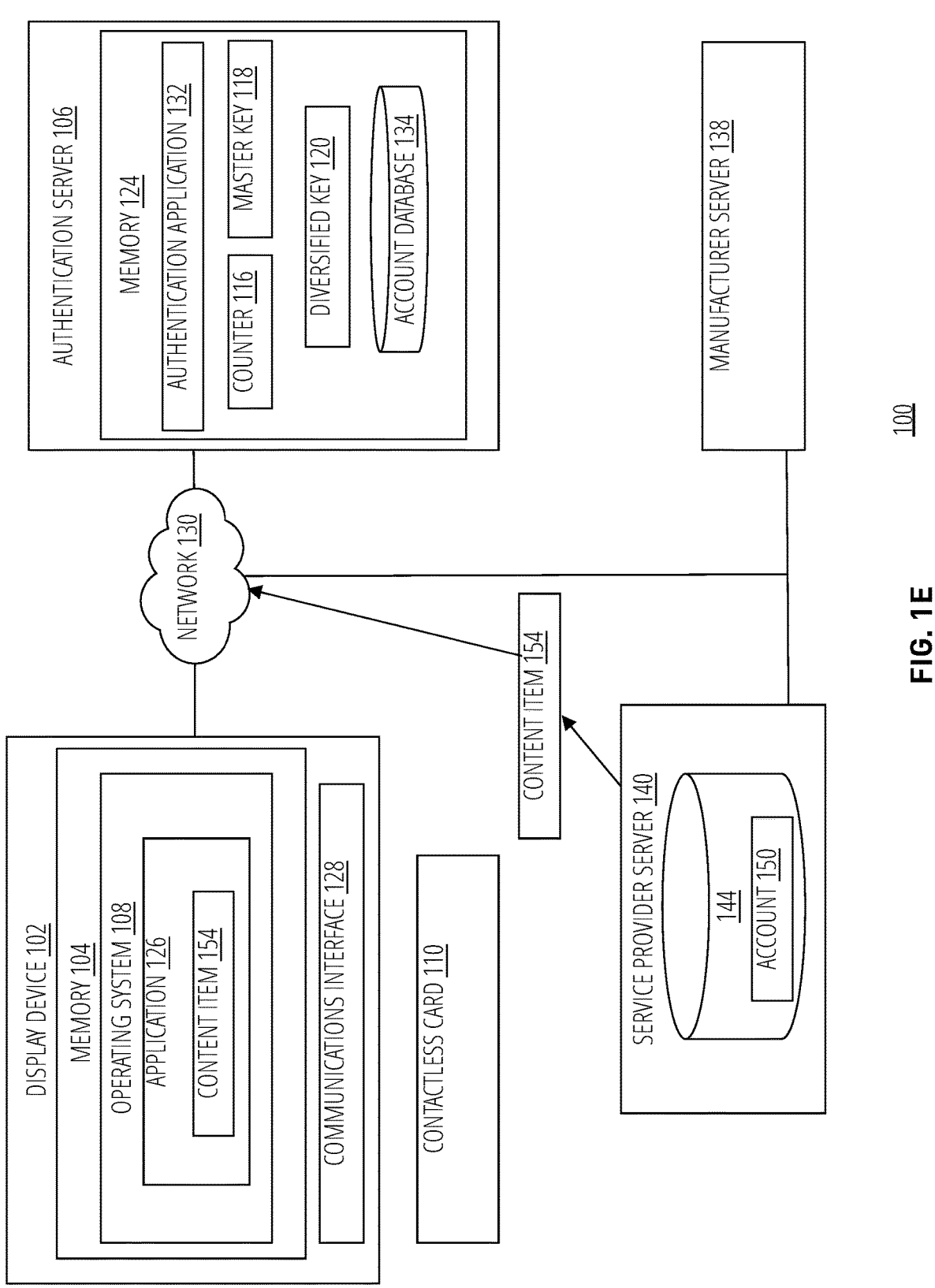
FIG. 1E illustrates an aspect of the subject matter in accordance with one embodiment.

FIG. 1E depicts an embodiment where the application 126, which has been authenticated with the service provider server 140 based on the authentication token 152, has requested a content item 154 from the service provider server 140. As shown, the service provider server 140 may transmit at least a portion of the content item 154 to the display device 102. The application 126 may display the received portion of the content item 154 on the display device 102.

Figure 2A:
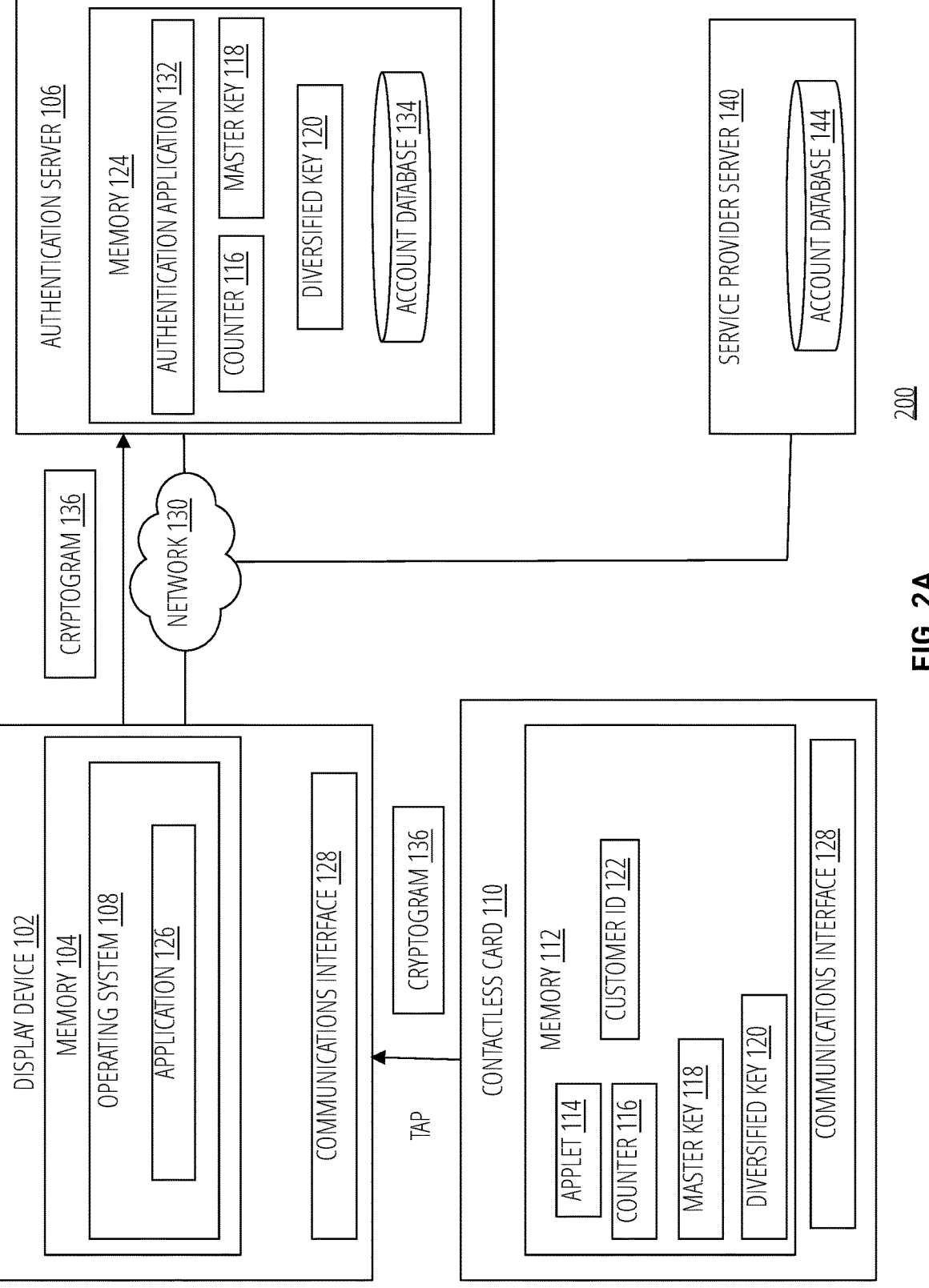
FIG. 2A illustrates an aspect of the subject matter in accordance with one embodiment.

FIG. 2A is a schematic 200 illustrating an embodiment of using the contactless card 110 to authenticate into a plurality of accounts with a plurality of service providers. Generally, users may subscribe to multiple services with multiple service providers. For example, a purchaser of a new display device 102 may have accounts with service providers X, Y, and Z. Advantageously, using the techniques described herein, the contactless card 110 may be used to log into the accounts with the service providers X, Y, and Z.

As shown, the user may tap the contactless card 110 to the display device 102, thereby causing the applet 114 to generate a cryptogram 136 as described above, e.g., by generating a diversified key 120 based on the master key 118 and counter 116, and generating the cryptogram 136 using the diversified key 120 to encrypt the customer ID 122. The cryptogram 136 may include the unencrypted customer ID 122. The display device 102 may transmit the cryptogram 136 to the authentication server 106, which may decrypt the cryptogram 136 as described above, e.g., by generating a diversified key 120 based on the master key 118 and counter 116, and decrypting the cryptogram 136 using the diversified key 120.

Figure 2B:
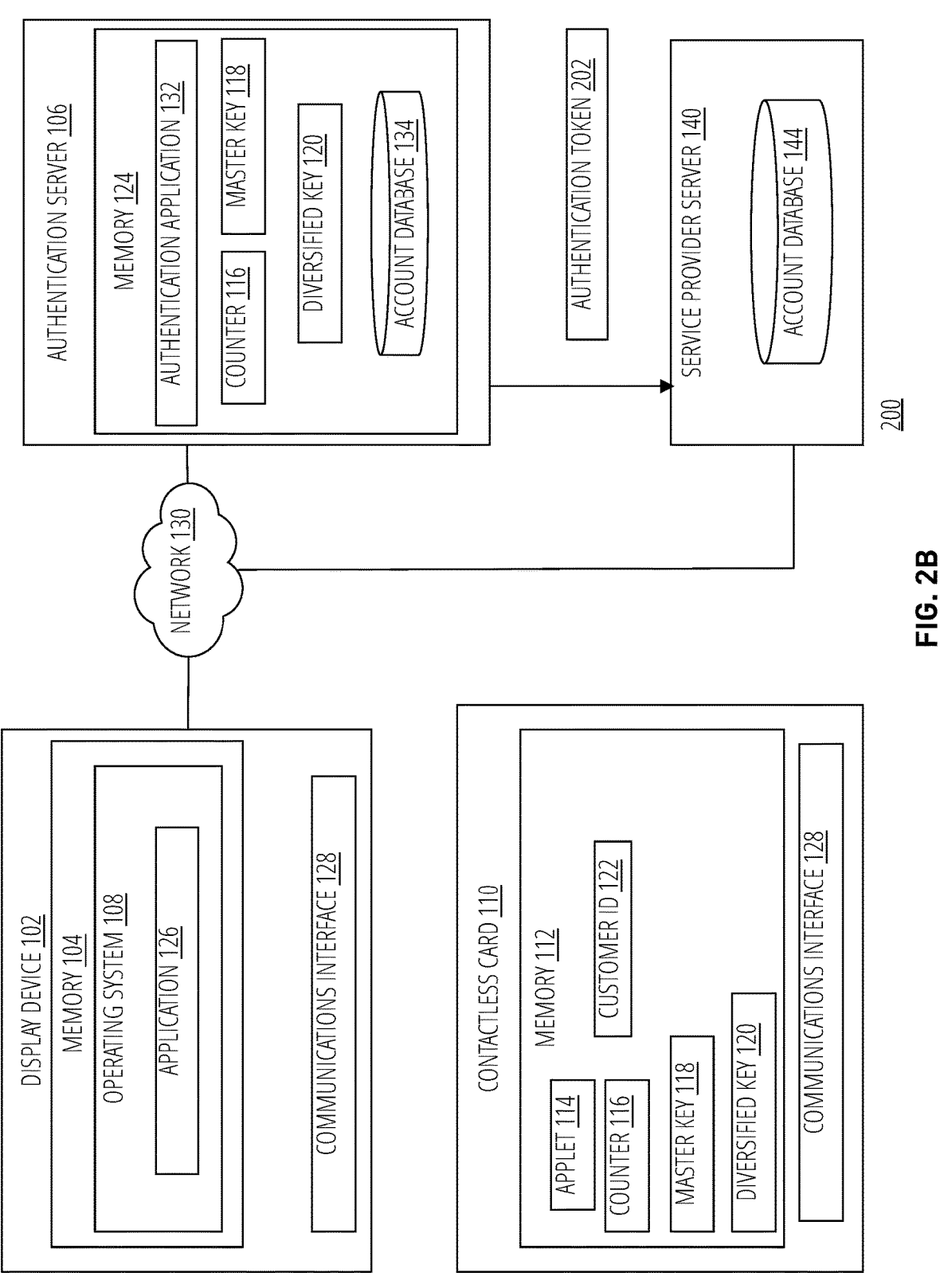
FIG. 2B illustrates an aspect of the subject matter in accordance with one embodiment.

FIG. 2B illustrates an embodiment where the authentication server 106 decrypts the cryptogram 136 received in FIG. 2A. Based on the successful decryption, the authentication server 106 may search the account database 134 to identify payment records in the account associated with the contactless card 110. The search may be limited to known service providers. In some embodiments, the search is further limited to a recent time period (e.g., 1 month, 3 months, etc.). Doing so allows the authentication server 106 to identify any active accounts the user may have with the plurality of service providers. Continuing with the previous example, the authentication server 106 may identify payment records for service providers X, Y, and Z in the account database 134.

Based on the identified payment records, the authentication server 106 may generate an authentication token 202. The authentication token 202 may include contact information, account numbers with the service provider, a payment confirmation, or any information that may enable the service provider server 140 to identify an account in the account database 144. In some embodiments, the authentication server 106 generates a respective authentication token 202 for each identified account (e.g., a first authentication token 202 for service provider X, a second authentication token 202 for service provider Y, and a third authentication token 202 for service provider Z).

The authentication server 106 may transmit the authentication token 202 to the service provider server 140. In some embodiments, the authentication server 106 transmits the authentication token 202 to the manufacturer server 138, which may transmit the authentication token 202 to the service provider server 140. Generally, once received, the service provider server 140 may "trust" the authentication token 202 and generate an authentication token 202 that can be used to access the corresponding account via the application 126 of the display device 102. In some embodiments, rather than generating a new token, the service provider server 140 may use the authentication token 202 to provide access to the corresponding account in the account database 144.

Figure 2C:
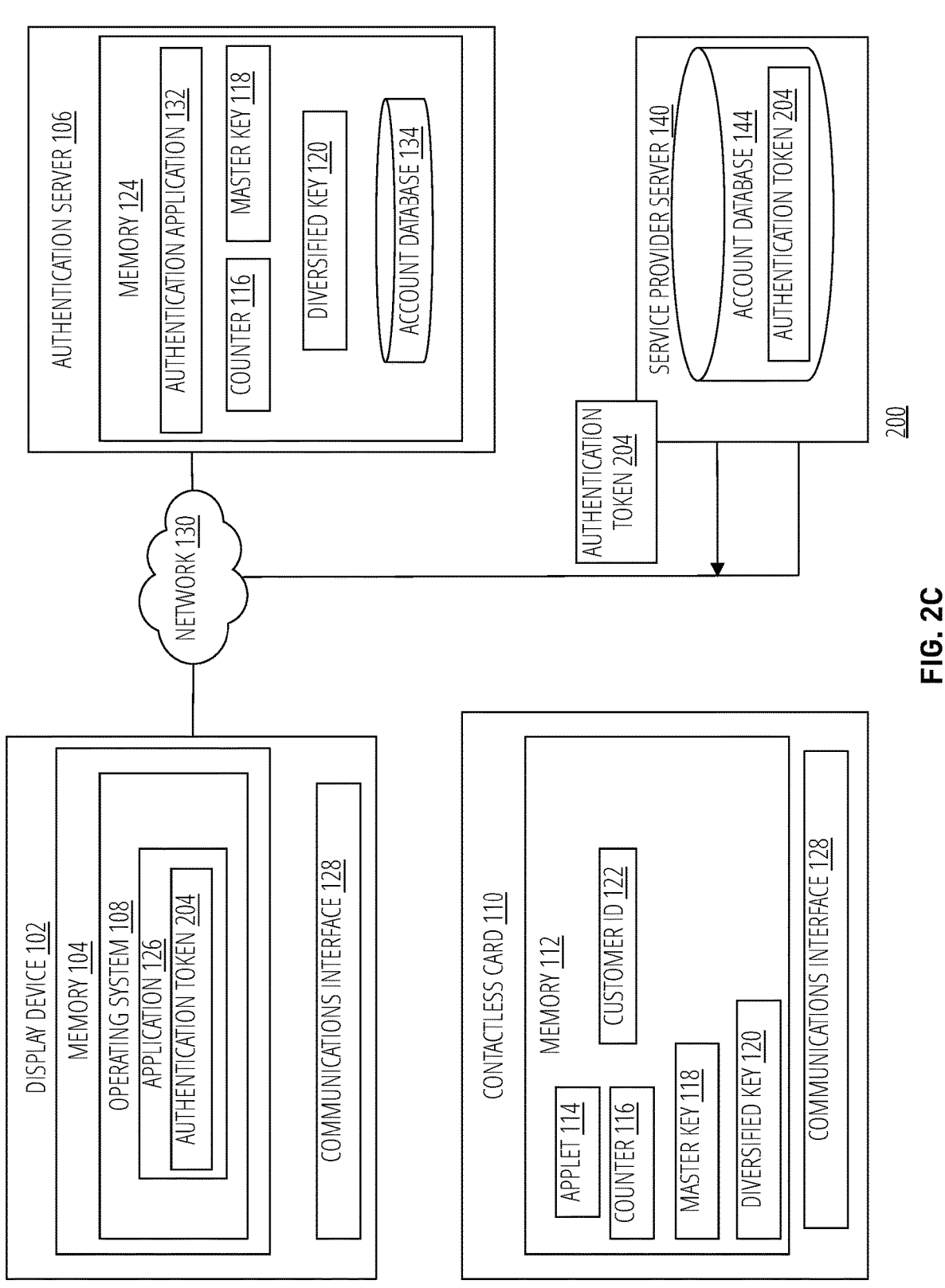
FIG. 2C illustrates an aspect of the subject matter in accordance with one embodiment.

FIG. 2C illustrates an embodiment where the service provider server 140 generates an authentication token 204 based on the authentication token 202 generated by the authentication server 106. While FIG. 2C illustrates a single instance of the authentication token 204, each service provider server 140 receiving an authentication token 202 may generate a respective authentication token 204. Continuing with the previous example, the service provider servers 140 for service providers X, Y, and Z may each generate a respective authentication token 204 (for a total of three authentication tokens 204). Once generated, the respective service provider server 140 transmits the authentication token 204 to the display device 102. In some embodiments, the service provider server 140 transmits the authentication token 204 to the manufacturer server 138, which in turn transmits the authentication token 204 to the display device 102. Each corresponding application 126 may receive the authentication token 204, which may be used to access the corresponding account in the account databases 144. Advantageously, doing so automatically logs the display device 102 into each service provider account based on the payment records in the account database 134 and the successful decryption of the cryptogram 136.

FIG. 3A is a schematic 300a illustrating an embodiment where a contactless card 110 is tapped to a display device 102. As shown, the display device 102 may be executing an application 126 when the contactless card 110 is tapped to the display device 102. The communications interface 128 of the display device 102 may read a cryptogram generated by the applet 114 of the contactless card 110. The cryptogram may correspond to the cryptogram 136 described elsewhere herein. The application 126 may then transmit the cryptogram and any other data as part of a request to the authentication server 106. The additional data may include the unencrypted customer ID 122, an identifier of the display device 102, an identifier of the application 126, location information for the display device 102, and the like.

Figure 3B:
FIG. 3B illustrates an aspect of the subject matter in accordance with one embodiment.

FIG. 3B is a schematic 300b illustrating an embodiment where an account is automatically generated responsive to the request in FIG. 3A. Generally, in FIG. 3B, the authentication server 106 has verified (or authenticated) the cryptogram generated by the contactless card 110. Based on the verification (and any other additional security measures, such as location verification, OTP verification, etc.), the authentication server 106 may generate payment information comprising a VAN, expiration date, and CVV. The authentication server 106 may then transmit the payment information to the service provider server 140 associated with the requested service. In at least one embodiment, the authentication server 106 identifies the service provider server 140 based on the application 126 transmitting the cryptogram and/or an application identifier specified in the request transmitted by the application 126. The service provider server 140 may then generate an account record in the account database 144, and an authentication token for the account. The service provider server 140 may transmit the token to the requesting application 126 on the display device 102, which may then access the newly generated account based on the token. For example, as shown in FIG. 3B, the application 126 may display one or more attributes of the newly created account.

FIG. 4A is a schematic 400a illustrating an embodiment where a contactless card 110 is tapped to a display device 102 to automatically log in to a plurality of service provider accounts using the contactless card 110. Generally, the display device 102 may be displaying a home screen of the operating system 108 and/or an application 126 when the contactless card 110 is tapped to the display device 102. The communications interface 128 of the display device 102 may read a cryptogram generated by the applet 114 of the contactless card 110. The cryptogram may correspond to the cryptogram 136 described elsewhere herein. The application 126 may then transmit the cryptogram and any other data as part of a request to the authentication server 106. The additional data may include the unencrypted customer ID 122, an identifier of the display device 102, an identifier of the application 126, location information for the display device 102, and the like.

Figure 4B:
FIG. 4B illustrates an aspect of the subject matter in accordance with one embodiment.

FIG. 4B is a schematic 400b illustrating an embodiment where the display device 102 is logged into example accounts with service providers A, B, and C based on the tap of the contactless card 110 to the display device 102 in FIG. 4A. Generally, the authentication server 106 may decrypt the cryptogram generated in FIG. 4A by the contactless card 110, thereby verifying the cryptogram. In response to the decryption, the authentication server 106 may identify one or more payment records in the account database 134. The payment records may include payments for one or more accounts with one or more service providers. For example, the authentication server 106 may identify payment records for service provider A, service provider B, and service provider C. The authentication server 106 may then generate an authentication token 202 for the account associated with the contactless card 110. The authentication server 106 may then transmit the token to each identified service provider server 140 based on the service providers identified in the payment records, e.g., the service provider servers 140 for service providers A, B, and C. The service provider servers 140 may identify an account in the account database 144 based on the received token. For example, the token may include a respective account number for the accounts in the account databases 144. Based on receiving the authentication token 202, the service provider servers 140 may generate a respective authentication token 202 for the identified account in the account database 144. The service provider servers 140 may then transmit the generated tokens to the display device 102, which may use the tokens to log into the accounts with service providers A, B, and C.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

FIG. 5 illustrates an embodiment of a logic flow 500. The logic flow 500 may be representative of some or all of the operations executed by one or more embodiments described herein. For example, the logic flow 500 may include some or all of the operations to use a contactless card 110 to register for a service with a service provider. Embodiments are not limited in this context.

In block 502, logic flow 500 receives, by an application 126 executing on a processor of a display device 102, a request comprising a service provider. In block 504, logic flow 500 receives, by a communications interface 128 of the display device, a cryptogram 136 generated by an applet 114 of a contactless card 110. In block 506, logic flow 500 transmits, by the application 126, the cryptogram 136 to an authentication server 106 associated with the contactless card 110. In block 508, logic flow 500 decrypts, by the authentication server 106, the cryptogram 136. In block 510, logic flow 500 generates, by the authentication server 106 based on the decryption of the cryptogram 136, payment information comprising a virtual account number associated with the contactless card 110. The payment information may further include an expiration date, CVV, and/or other account data, such as address, name, etc. In block 512, logic flow 500 transmits, by the authentication server 106, the payment information to a service provider server 140. The authentication server 106 may identify the service provider server 140 based at least in part on the application 126 and/or one or more identifiers received with the cryptogram 136 at block 504. In block 514, logic flow 500 creates, by the service provider server 140, an account based at least in part on the virtual account number and the decryption of the cryptogram by the authentication server. Generally, the service provider server 140 may create the account and use the payment information received from the authentication server 106 to process payment for the account.

In block 516, logic flow 500 receives, by the application 126, an authentication token 202 generated by the service provider server 140 for the account. In block 518, logic flow 500 accesses, by the application 126, the account created by the service provider server 140 based at least in part on the authentication token. In block 520, logic flow 500 displays, by the application, one or more attributes of the account generated by the service provider based on the authentication token. In block 522, logic flow 500 receives, by the application 126 executing on the processor of the display device 102, a request comprising a content item. The application 126 may then request the content item from the service provider server 140. The service provider server 140 may transmit at least a portion of the first content item to the display device. In block 524, logic flow 500 displays, by the display device 102, at least a portion of the received content item.

FIG. 6 illustrates an embodiment of a logic flow 600. The logic flow 600 may be representative of some or all of the operations executed by one or more embodiments described herein. For example, the logic flow 600 may include some or all of the operations to use a contactless card 110 to automatically log into a plurality of service provider accounts. Embodiments are not limited in this context.

In block 602, logic flow 600 receives, by an application 126 executing on a processor of a display device 102, a request to access one or more accounts with one or more service providers of a plurality of service providers. In block 604, logic flow 600 receives, by the application 126 via a communications interface 128 of the display device 102, a cryptogram 136 from an applet 114 of a contactless card 110. In block 606, logic flow 600 transmits, by the application 126, the cryptogram 136 to an authentication server 106. In block 608, logic flow 600 decrypts, by the authentication server 106, the cryptogram 136. In block 610, logic flow 600 identifies, by the authentication server 106 based on the decryption of the cryptogram, a payment record associated with the contactless card 110 for an account with a first service provider of the plurality of service providers. The payment record may be identified in the account database 134.

In block 612, logic flow 600 transmits, by the authentication server 106 to a first service provider server 140 associated with the first service provider, an authorization request for the account for the first service provider. In block 614, logic flow 600 generates, by the first service provider server 140, an authentication token for the account with the first service provider based on the authorization request. In block 616, logic flow 600 transmits, by the first service provider server 140 to the application, the authentication token. In block 618, logic flow 600 accesses, by the application, the account with the first service provider using the authentication token, e.g., by transmitting the token to the service provider server 140 for verification. In block 620, logic flow 600 displays, by the application, one or more attributes of the account with the first service provider.

Figure 7A:
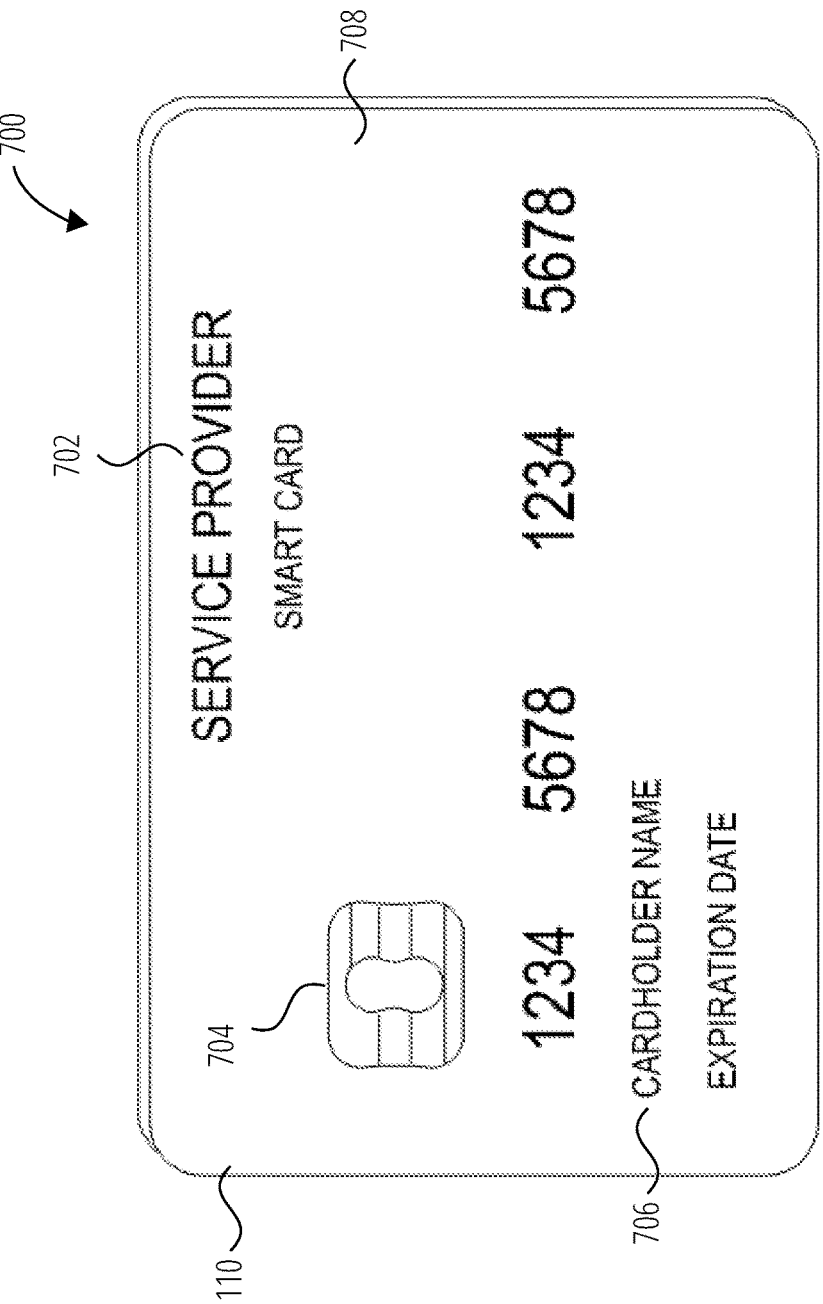
FIG. 7A illustrates a contactless card in accordance with one embodiment.

FIG. 7A illustrates an example configuration of a contactless card 110, which may include a contactless card, a payment card, such as a credit card, debit card, or gift card, issued by a service provider as displayed as service provider indicia 702 on the front or back of the contactless card 110. In some examples, the contactless card 110 is not related to a payment card, and may include, without limitation, an identification card. In some examples, the transaction card may include a dual interface contactless payment card, a rewards card, and so forth. The contactless card 110 may include a substrate 708, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 110 may have physical characteristics compliant with the ID-1 format of the ISO/IEC 7816 standard, and the transaction card may otherwise be compliant with the ISO/IEC 14443 standard. However, it is understood that the contactless card 110 according to the present disclosure may have different characteristics, and the present disclosure does not require a transaction card to be implemented in a payment card.

The contactless card 110 may also include identification information 706 displayed on the front and/or back of the card, and a contact pad 704. The contact pad 704 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 110 may also include processing circuitry, antenna and other components as will be further discussed in FIG. 7B. These components may be located behind the contact pad 704 or elsewhere on the substrate 708, e.g. within a different layer of the substrate 708, and may electrically and physically coupled with the contact pad 704. The contactless card 110 may also include a magnetic strip or tape, which may be located on the back of the card (not shown in FIG. 7A). The contactless card 110 may also include a Near-Field Communication (NFC) device coupled with an antenna capable of communicating via the NFC protocol. Embodiments are not limited in this manner.

Figure 7B:
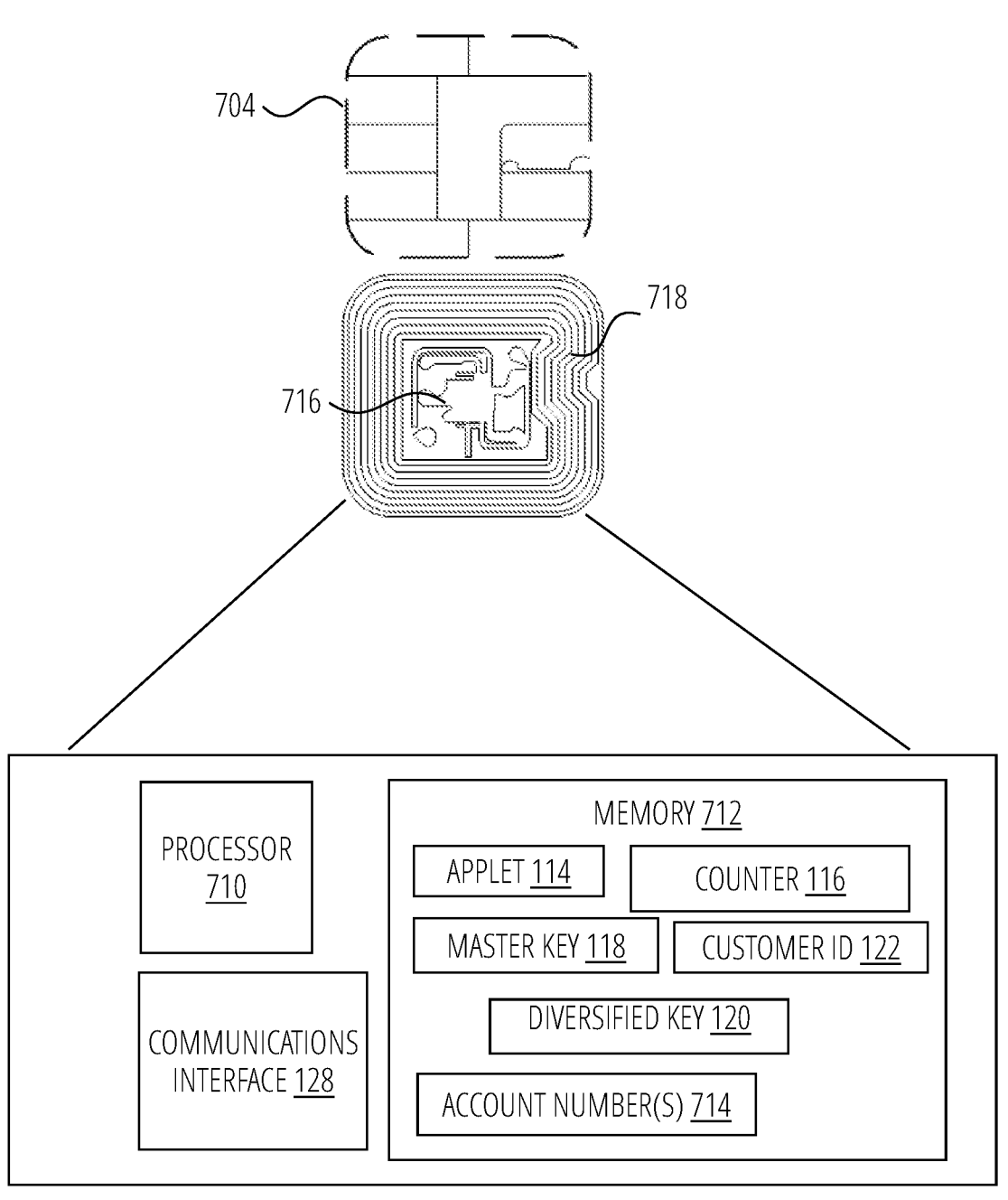
FIG. 7B illustrates a contactless card in accordance with one embodiment.

As illustrated in FIG. 7B, the contact pad 704 of contactless card 110 may include processing circuitry 716 for storing, processing, and communicating information, including a processor 710, a memory 712, and one or more communications interface 128. It is understood that the processing circuitry 716 may contain additional components, including processors, memories, error and parity/CRC checkers, data encoders, anticollision algorithms, controllers, command decoders, security primitives and tamperproofing hardware, as necessary to perform the functions described herein.

The memory 712 may be a read-only memory, write-once read-multiple memory or read/write memory, e.g., RAM, ROM, and EEPROM, and the contactless card 110 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 712 may be encrypted memory utilizing an encryption algorithm executed by the processor 710 to encrypted data.

The memory 712 may be configured to store one or more applet 114, one or more counter 116, a customer ID 122, and the account number(s) 714, which may be virtual account numbers. The one or more applet 114 may comprise one or more software applications configured to execute on one or more contactless cards, such as a Java® Card applet. However, it is understood that applet 114 are not limited to Java Card applets, and instead may be any software application operable on contactless cards or other devices having limited memory. The one or more counter 116 may comprise a numeric counter sufficient to store an integer. The customer ID 122 may comprise a unique alphanumeric identifier assigned to a user of the contactless card 110, and the identifier may distinguish the user of the contactless card from other contactless card users. In some examples, the customer ID 122 may identify both a customer and an account assigned to that customer and may further identify the contactless card 110 associated with the customer's account. As stated, the account number(s) 714 may include thousands of one-time use virtual account numbers associated with the contactless card 110. An applet 114 of the contactless card 110 may be configured to manage the account number(s) 714 (e.g., to select an account number(s) 714, mark the selected account number(s) 714 as used, and transmit the account number(s) 714 to a mobile device for autofilling by an autofilling service.

The processor 710 and memory elements of the foregoing exemplary embodiments are described with reference to the contact pad 704, but the present disclosure is not limited thereto. It is understood that these elements may be implemented outside of the contact pad 704 or entirely separate from it, or as further elements in addition to processor 710 and memory 712 elements located within the contact pad 704.

In some examples, the contactless card 110 may comprise one or more antenna(s) 718. The one or more antenna(s) 718 may be placed within the contactless card 110 and around the processing circuitry 716 of the contact pad 704. For example, the one or more antenna(s) 718 may be integral with the processing circuitry 716 and the one or more antenna(s) 718 may be used with an external booster coil. As another example, the one or more antenna(s) 718 may be external to the contact pad 704 and the processing circuitry 716.

In an embodiment, the coil of contactless card 110 may act as the secondary of an air core transformer. The terminal may communicate with the contactless card 110 by cutting power or amplitude modulation. The contactless card 110 may infer the data transmitted from the terminal using the gaps in the contactless card's power connection, which may be functionally maintained through one or more capacitors. The contactless card 110 may communicate back by switching a load on the contactless card's coil or load modulation. Load modulation may be detected in the terminal's coil through interference. More generally, using the antenna(s) 718, processor 710, and/or the memory 712, the contactless card 110 provides a communications interface to communicate via NFC, Bluetooth, and/or Wi-Fi communications.

As explained above, contactless card 110 may be built on a software platform operable on smart cards or other devices having limited memory, such as JavaCard, and one or more or more applications or applets may be securely executed. Applet 114 may be added to contactless cards to provide a one-time password (OTP) for multifactor authentication (MFA) in various mobile application-based use cases. Applet 114 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet 114 may be configured to encode the OTP as an NDEF type 4 well known type text tag. In some examples, NDEF messages may comprise one or more records. The applet 114 may be configured to add one or more static tag records in addition to the OTP record.

In some examples, the one or more applet 114 may be configured to emulate an RFID tag. The RFID tag may include one or more polymorphic tags. In some examples, each time the tag is read, different cryptographic data is presented that may indicate the authenticity of the contactless card. Based on the one or more applet 114, an NFC read of the tag may be processed, the data may be transmitted to a server, such as a server of a banking system, and the data may be validated at the server.

In some examples, the contactless card 110 and server may include certain data such that the card may be properly identified. The contactless card 110 may include one or more unique identifiers (not pictured). Each time a read operation takes place, the counter 116 may be configured to increment. In some examples, each time data from the contactless card 110 is read (e.g., by a mobile device), the counter 116 is transmitted to the server for validation and determines whether the counter 116 are equal (as part of the validation) to a counter of the server.

The one or more counters 116 may be configured to prevent a replay attack. For example, if a cryptogram has been obtained and replayed, that cryptogram is immediately rejected if the counter 116 has been read or used or otherwise passed over. If the counter 116 has not been used, it may be replayed. In some examples, the counter that is incremented on the card is different from the counter that is incremented for transactions. The contactless card 110 is unable to determine the application transaction counter 116 since there is no communication between applet 114 on the contactless card 110. In some examples, the contactless card 110 may comprise a first applet 114-1, which may be a transaction applet, and a second applet 114-2. Each applet 114-1 and 114-2 may comprise a respective counter 116.

In some examples, the counter 116 may get out of sync. In some examples, to account for accidental reads that initiate transactions, such as reading at an angle, the counter 116 may increment but the application does not process the counter 116. In some examples, when the reading device (e.g., the display device 102) is woken up, NFC may be enabled and the device may be configured to read available tags, but no action is taken responsive to the reads.

To keep the counter 116 in sync, an application, such as a background application, may be executed that would be configured to detect when the a device such as the display device 102 wakes up and synchronize with the server of a banking system indicating that a read that occurred due to detection to then move the counter 116 forward. In other examples, Hashed One Time Password may be utilized such that a window of mis-synchronization may be accepted. For example, if within a threshold of 10, the counter 116 may be configured to move forward. But if within a different threshold number, for example within 10 or 1000, a request for performing re-synchronization may be processed which requests via one or more applications that the user tap, gesture, or otherwise indicate one or more times via the user's device. If the counter 116 increases in the appropriate sequence, then it possible to know that the user has done so.

The key diversification technique described herein with reference to the counter 116, master key 118, and diversified key 120, is one example of encryption and/or decryption a key diversification technique. This example key diversification technique should not be considered limiting of the disclosure, as the disclosure is equally applicable to other types of key diversification techniques.

During the creation process of the contactless card 110, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 110. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 110 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 8:
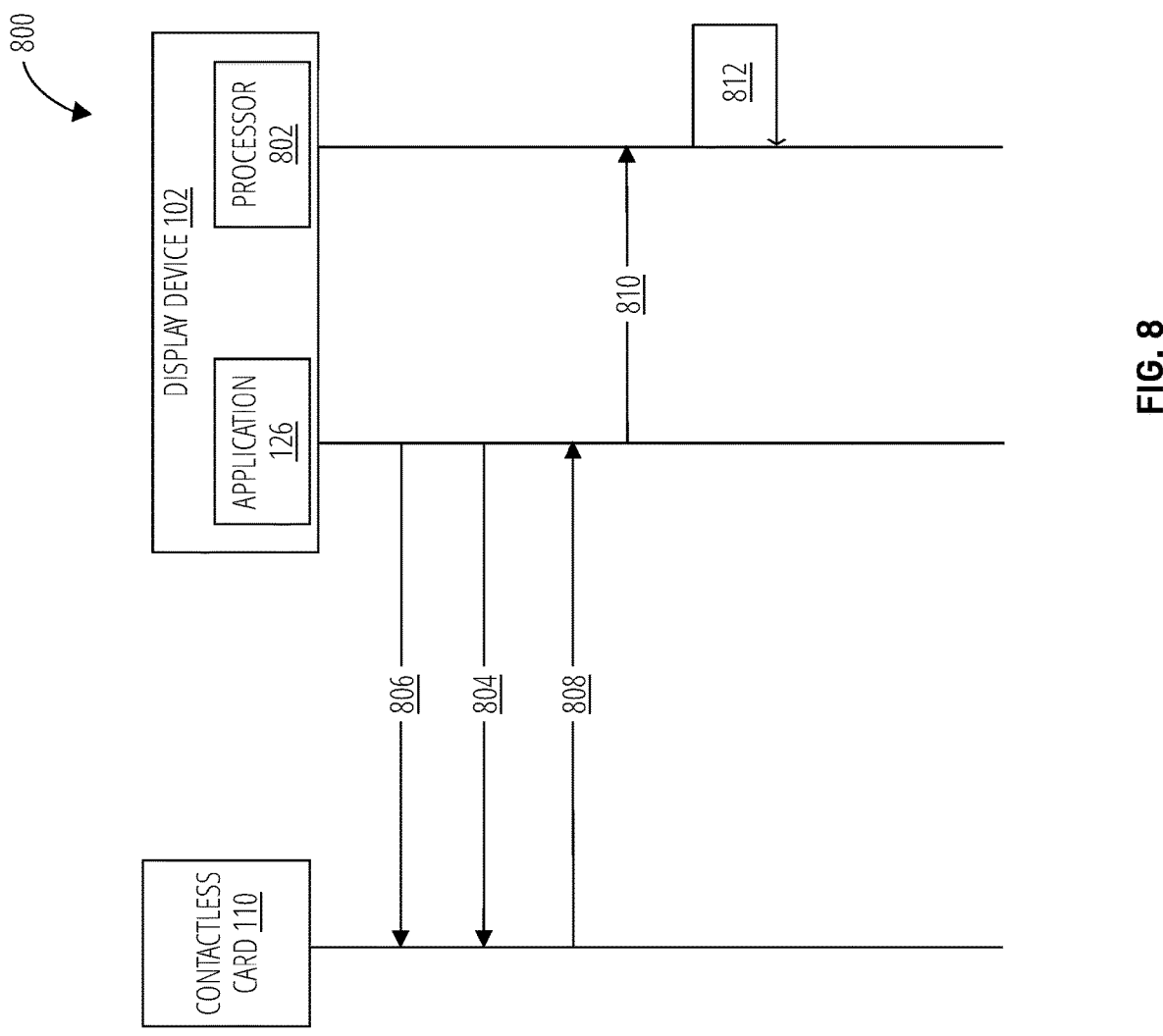
FIG. 8 illustrates a sequence flow in accordance with one embodiment.

FIG. 8 is a timing diagram illustrating an example sequence for providing authenticated access according to one or more embodiments of the present disclosure. Sequence flow 800 may include contactless card 110 and display device 102, which may include an application 126 and processor 802.

At line 806, the application 126 communicates with the contactless card 110 (e.g., after being brought near the contactless card 110). Communication between the application 126 and the contactless card 110 may involve the contactless card 110 being sufficiently close to a card reader (not shown) of the display device 102 to enable NFC data transfer between the application 126 and the contactless card 110.

At line 804, after communication has been established between display device 102 and contactless card 110, contactless card 110 generates a message authentication code (MAC) cryptogram. In some examples, this may occur when the contactless card 110 is read by the application 126. In particular, this may occur upon a read, such as an NFC read, of a near field data exchange (NDEF) tag, which may be created in accordance with the NFC Data Exchange Format. For example, a reader application, such as application 126, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 110 may be updated or incremented, which may be followed by "Read NDEF file." At this point, the message may be generated which may include a header and a shared secret. Session keys may then be generated. The MAC cryptogram (e.g., the cryptogram 136) may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 126 may be configured to transmit a request to contactless card 110, the request comprising an instruction to generate a MAC cryptogram.

At line 808, the contactless card 110 sends the MAC cryptogram to the application 126. In some examples, the transmission of the MAC cryptogram occurs via NFC, however, the present disclosure is not limited thereto. In other examples, this communication may occur via Bluetooth, Wi-Fi, or other means of wireless data communication. At line 810, the application 126 communicates the MAC cryptogram to the processor 802.

At line 812, the processor 802 verifies the MAC cryptogram pursuant to an instruction from the application 126. For example, the MAC cryptogram may be verified, as explained below. In some examples, verifying the MAC cryptogram may be performed by a device other than display device 102, such as a server of a banking system in data communication with the display device 102. For example, processor 802 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 9:
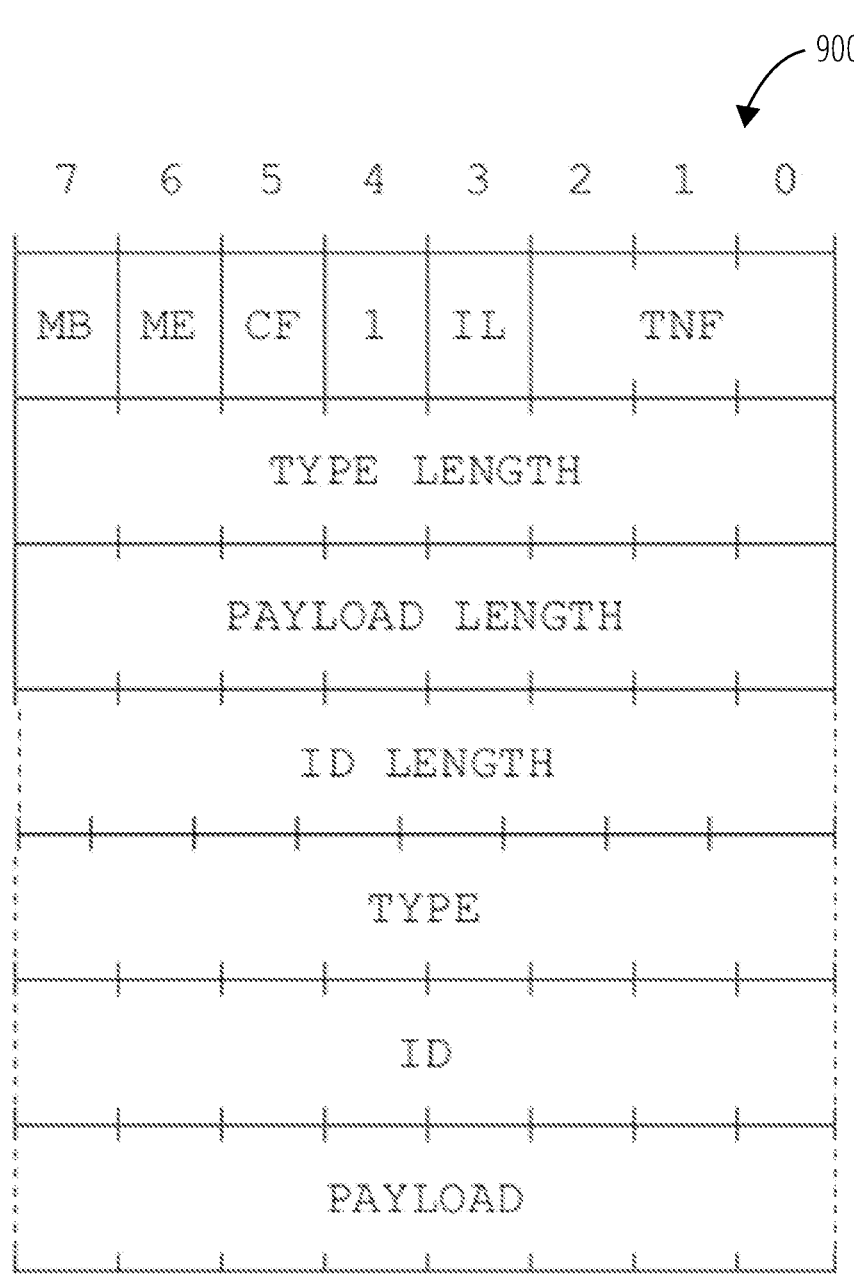
FIG. 9 illustrates a data structure in accordance with one embodiment.

FIG. 9 illustrates an NDEF short-record layout (SR=1) data structure 900 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

Figure 10:
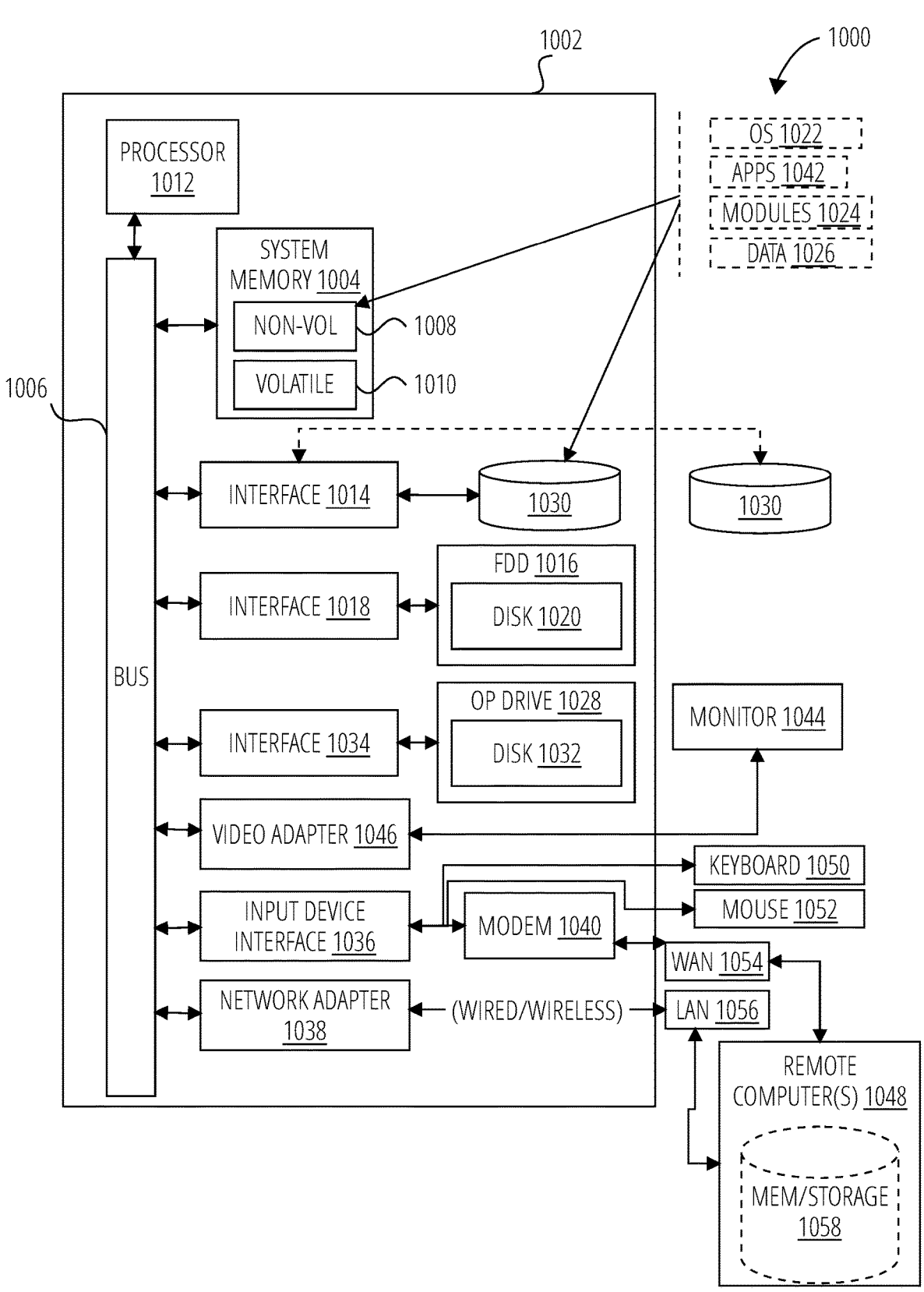
FIG. 10 illustrates a computer architecture in accordance with one embodiment.

FIG. 10 illustrates an embodiment of an exemplary computer architecture 1000 suitable for implementing various embodiments as previously described. In one embodiment, the computer architecture 1000 may include or be implemented as part of system 100. For example, the computer 1002 may be representative of at least a portion of the display device 102 and/or the servers of FIG. 1A.

As used in this application, the terms "system" and "component" are intended to refer to a computer-related entity, either hardware, a combination of hardware and software, software, or software in execution, examples of which are provided by the exemplary computing computer architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing computer architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computer 1002 includes a processor 1012, a system memory 1004 and a system bus 1006. The processor 1012 can be any of various commercially available processors.

The system bus 1006 provides an interface for system components including, but not limited to, the system memory 1004 to the processor 1012. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 100 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory

1004 can include non-volatile 1008 and/or volatile 1010. A basic input/output system (BIOS) can be stored in the non-volatile 1008.

The computer 1002 may include various types of computer-readable storage media in the form of one or more lower speed memory units, including an internal (or external) hard disk drive 1030, a magnetic disk drive 1016 to read from or write to a removable magnetic disk 1020, and an optical disk drive 1028 to read from or write to a removable optical disk 1032 (e.g., a CD-ROM or DVD). The hard disk drive 1030, magnetic disk drive 1016 and optical disk drive 1028 can be connected to system bus 1006 the by an HDD interface 1014, and FDD interface 1018 and an optical disk drive interface 1034, respectively. The HDD interface 1014 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1008, and volatile 1010, including an operating system 1022, one or more applications 1042, other program modules 1024, and program data 1026. In one embodiment, the one or more applications 1042, other program modules 1024, and program data 1026 can include, for example, the various applications and/or components of the system 100.

A user can enter commands and information into the computer 1002 through one or more wire/wireless input devices, for example, a keyboard 1050 and a pointing device, such as a mouse 1052. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 1012 through an input device interface 1036 that is coupled to the system bus 1006 but can be connected by other interfaces such as a parallel port, IEEE 1394 serial port, a game port, a USB port, an IR interface, and so forth.

A monitor 1044 or other type of display device is also connected to the system bus 1006 via an interface, such as a video adapter 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all the elements described relative to the computer 1002, although, for purposes of brevity, only a memory and/or storage device 1058 is illustrated. The logical connections depicted include wire/wireless connectivity to a local area network 1056 and/or larger networks, for example, a wide area network 1054. Such LAN and WAN networking environments are commonplace in offices and companies, and facilitate enterprise-wide computer networks, such as intranets, all of which may connect to a global communications network, for example, the Internet.

When used in a local area network 1056 networking environment, the computer 1002 is connected to the local area network 1056 through a wire and/or wireless communication network interface or network adapter 1038. The network adapter 1038 can facilitate wire and/or wireless communications to the local area network 1056, which may also include a wireless access point disposed thereon for communicating with the wireless functionality of the network adapter 1038.

When used in a wide area network 1054 networking environment, the computer 1002 can include a modem 1040, or is connected to a communications server on the wide area network 1054 or has other means for establishing communications over the wide area network 1054, such as by way of the Internet. The modem 1040, which can be internal or external and a wire and/or wireless device, connects to the system bus 1006 via the input device interface 1036. In a networked environment, program modules depicted relative to the computer 1002, or portions thereof, can be stored in the remote memory and/or storage device 1058. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, ac, ax, etc.) to provide secure, reliable, fast wireless connectivity. A Wi-Fi network can be used to connect computers to each other, to the Internet, and to wire networks (which use IEEE 802.3-related media and functions).

Figure 11:
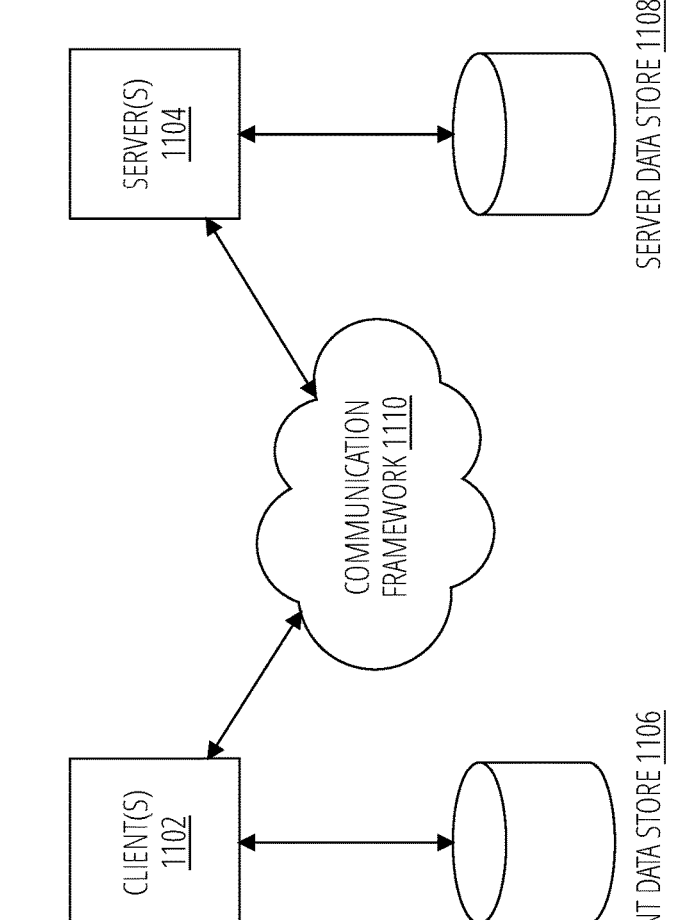
FIG. 11 illustrates a communications architecture in accordance with one embodiment.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100, which may be consistent with system 100.

As shown in FIG. 11, the communications architecture 1100 includes one or more client(s) 1102 and server(s) 1104. The server(s) 1104 may implement one or more devices of system 100. The client(s) 1102 and the server(s) 1104 are operatively connected to one or more respective client data store 1106 and server data store 1108 that can be employed to store information local to the respective client(s) 1102 and server(s) 1104, such as cookies and/or associated contextual information.

The client(s) 1102 and the server(s) 1104 may communicate information between each other using a communication framework 1110. The communication framework 1110 may implement any well-known communications techniques and protocols. The communication framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1110 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 1102 and the server(s) 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

The various elements of the devices as previously described with reference to FIGS. 1A-11 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:

receiving, by an application executing on a processor of a display device, a first request to access one or more accounts with a plurality of service providers;

receiving, by a wireless interface of the display device, encrypted data;

transmitting, by the application, the encrypted data and an identifier of the application to an authentication server;

receiving, by the application from the authentication server, a decryption result specifying the encrypted data was decrypted by the authentication server;

receiving, by the application from the authentication server based on the decryption of the encrypted data and the identifier of the application, a confirmation result specifying that an account database of the one or more accounts includes a payment record reflecting payment for an account with a first service provider of the plurality of service providers;

receiving, by the application from the first service provider, a first authentication token for the first service provider; and accessing, by the application, the account with the first service provider using the first authentication token.

2. The method of claim 1, further comprising:

receiving, by the application, a second request comprising a content item;

receiving, from the first service provider, a first portion of the content item; and displaying, by the display device, the first portion of the content item.

3. The method of claim 1, wherein the account with the first service provider is generated by the first service provider based at least in part on payment information generated by the authentication server.

4. The method of claim 2, wherein the payment information comprises an account number, an expiration date of the account number, and a card verification value (CVV) of the account number.

5. The method of claim 4, wherein the account number is restricted to use with the first service provider.

6. The method of claim 1, further comprising:

transmitting, by the application, location information for the display device to the authentication server; and receiving, by the application from the authentication server, an indication specifying the location information of the display device is within a predefined distance of an address.

7. The method of claim 1, wherein the encrypted data is received using Near Field Communication (NFC).

8. A method, comprising:

receiving, by an application executing on a processor of a display device, a first request comprising a service provider;

receiving, by the application via a wireless interface of the display device, encrypted data;

transmitting, by the application, the encrypted data and an identifier of the application to an authentication server;

receiving, by the application from the authentication server, a decryption result specifying the authentication server decrypted the encrypted data;

receiving, by the application from the service provider based on the authentication server decrypting the encrypted data and the identifier of the application, an authentication token for an account generated by the service provider; and accessing, by the application, the account created by the service provider based at least in part on the authentication token.

9. The method of claim 8, wherein the account is generated by the service provider based at least in part on the authentication server decrypting the encrypted data.

10. The method of claim 9, wherein the account is generated by the service provider based at least in part on payment information generated by the authentication server.

11. The method of claim 10, wherein the payment information comprises an account number, an expiration date of the account number, and a card verification value (CVV) of the account number.

12. The method of claim 8, further comprising:

receiving, by the application, a second request comprising a content item;

receiving, from the service provider, a first portion of the content item; and displaying, by the display device, the first portion of the content item.

13. The method of claim 8, further comprising:

transmitting, by the application, location information for the display device to the authentication server; and receiving, by the application from the authentication server, an indication specifying the location information of the display device is within a predefined distance of an address.

14. The method of claim 8, wherein the encrypted data is received using Near Field Communication (NFC).

15. A non-transitory computer-readable storage medium, the computer-readable storage medium including instructions that when executed by a processor of a display device, cause the processor to:

receive a first request comprising a service provider;

receive, via a wireless interface of the display device, encrypted data;

transmit the encrypted data and an identifier of an application running on the display device to an authentication server;

receive, from the authentication server, a decryption result specifying the authentication server decrypted the encrypted data;

receive, from the service provider based on the authentication server decrypting the encrypted data and the identifier of the application, an authentication token for an account generated by the service provider; and access the account created by the service provider based at least in part on the authentication token.

16. The computer-readable storage medium of claim 15, wherein the account is generated by the service provider based at least in part on the authentication server decrypting the encrypted data.

17. The computer-readable storage medium of claim 16, wherein the account is generated by the service provider based at least in part on payment information generated by the authentication server.

18. The computer-readable storage medium of claim 17, wherein the payment information comprises an account number, an expiration date of the account number, and a card verification value (CVV) of the account number.

19. The computer-readable storage medium of claim 15, wherein the instructions further cause the processor to:

receive a second request comprising a content item;

receive, from the service provider, a first portion of the content item; and display the first portion of the content item.

20. The computer-readable storage medium of claim 15, wherein the encrypted data is received using Near Field Communication (NFC).

* * * * *